(12) United States Patent
Lee et al.

(10) Patent No.: US 12,353,535 B2
(45) Date of Patent: Jul. 8, 2025

(54) STORAGE DEVICE, COMPUTING SYSTEM, AND METHOD FOR ACCESSING TO SECURE STORAGE AREA BASED ON ACCESS MODE

(71) Applicant: SK hynix Inc., Gyeonggi-do (KR)

(72) Inventors: Hui Won Lee, Gyeonggi-do (KR);
Byung Jun Kim, Gyeonggi-do (KR);
Taek Gyu Lee, Gyeonggi-do (KR);
Young Kyu Jeon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 354 days.

(21) Appl. No.: 17/942,267

(22) Filed: Sep. 12, 2022

(65) Prior Publication Data

US 2023/0136229 A1 May 4, 2023

(30) Foreign Application Priority Data

Nov. 3, 2021 (KR) .................. 10-2021-0150052
May 25, 2022 (KR) .................. 10-2022-0064212

(51) Int. Cl.
*G06F 21/34* (2013.01)
*G06F 21/00* (2013.01)
*G06F 21/44* (2013.01)

(52) U.S. Cl.
CPC .............. *G06F 21/34* (2013.01); *G06F 21/00* (2013.01); *G06F 21/44* (2013.01)

(58) Field of Classification Search
CPC ...................................................... G06F 21/34
USPC ......................................................... 726/16
See application file for complete search history.

(56) References Cited

U.S. PATENT DOCUMENTS

| | | | | |
|---|---|---|---|---|
| 8,613,055 B1* | 12/2013 | Tomilson | ................ | G06F 21/00 726/20 |
| 8,952,781 B2* | 2/2015 | Al-Azem | ............ | H04L 63/0861 382/116 |
| 11,750,397 B2* | 9/2023 | Seaborn | .................. | H04L 69/22 726/5 |
| 2009/0319741 A1* | 12/2009 | Gremaud | ................ | G06F 21/57 726/16 |
| 2013/0276149 A1* | 10/2013 | Gremaud | ................ | G06F 21/64 726/30 |
| 2015/0350206 A1* | 12/2015 | Shin | .................... | H04L 63/0876 713/170 |
| 2016/0112412 A1* | 4/2016 | Roth | ................... | H04L 63/0838 726/6 |
| 2021/0294923 A1* | 9/2021 | Kapron | .................... | G06F 21/74 |

(Continued)

FOREIGN PATENT DOCUMENTS

KR   10-2019-0099693 A   8/2019
KR   10-2020-0027982 A   3/2020

*Primary Examiner* — Thanh T Le
(74) *Attorney, Agent, or Firm* — IP & T GROUP LLP

(57) ABSTRACT

According to an embodiment of the present technology, a storage device may include a memory device including a secure storage area for storing therein data to be accessed according to authentication; an access mode memory configured to store therein information of device access mode regarding an operation mode for the secure storage area; and a memory controller configured to receive a command regarding the secure storage area from an external host and process the command according to whether information of host access mode included in the command matches the information of the device access mode.

20 Claims, 29 Drawing Sheets

(56) References Cited

U.S. PATENT DOCUMENTS

2022/0094680 A1\* 3/2022 Mirsky ................. H04L 43/10
2023/0297663 A1\* 9/2023 Farrell ................ H04L 9/3242

\* cited by examiner

| Basic Header Segment (61) | | | |
|---|---|---|---|
| Transaction Type | Flags | LUN | Task Tag |
| Initiator ID / Command Set Type | Query Function, Task Manag. Function | Response | Status |
| Total EHS Length | Device Information | Data Segment Length | |

FIG. 8

| | | | | |
|---|---|---|---|---|
| | \multicolumn{4}{c}{Response PIU} | | | |

| | | 0 Transaction Type | 1 Flags | 2 LUN | 3 Task Tag |
|---|---|---|---|---|---|
| Basic Header Segment | | 4 Initiator ID \| Command Set Type | 5 Reserved | 6 Reserved | 7 Reserved |
| | | 8 Total EHS Length | 9 Reserved | 10 (MSB) Data Segment Length | 11 (LSB) |
| Transaction Specific Fields | | 12 (MSB) | 13 Residual Transfer Count | 14 | 15 (LSB) |
| | | 16 | 17 Reserved | 18 | 19 |
| | | 20 | 21 Reserved | 22 | 23 |
| | | 24 | 25 Reserved | 26 | 27 |
| | | 28 | 29 Reserved | 30 | 31 |
| Extra Header Segment | | k | k+1 Extra Header Segment (EHS) 1 | k+2 | k+3 |
| | | ⋮ | | | |
| | | j | j+1 Extra Header Segment (EHS) N | j+2 | j+3 |
| | | \multicolumn{4}{c}{Header E2ECRC (omit if HD=0)} | | | |
| Data Segment | | k (MSB) Sense Data Length | k+1 (LSB) | k+2 Sense Data[0] | k+3 Sense Data[1] |
| | | ⋮ | ⋮ | ⋮ | ⋮ |
| | | k+16 Sense Data[14] | k+17 Sense Data[15] | k+18 Sense Data[16] | k+19 Sense Data[17] |
| | | \multicolumn{4}{c}{Data E2ECRC (omit if DD=0)} | | | |

FIG. 9
RPMB Message Components

| Component Name | Length | Request | Response | Description |
|---|---|---|---|---|
| Request Message Type | 2 bytes | Yes | Yes | This component indicates the request message type |
| Response Message Type | 2 bytes | No | Yes | This component indicates the response message type |
| Authentication Key | 32 bytes | Yes | No | This component is used only when programming the Authentication Key |
| MAC | 32 bytes | Yes | Yes | Message Authentication Code |
| Result | 2 bytes | No | Yes | This component provides the operation result |
| Write Counter | 4 bytes | Yes | Yes | Total amount of successful authenticated data write operations |
| Address | 2 bytes | Yes | Yes | Logical block address of data to be programmed to or read from the RPMB region |
| Nonce | 16 bytes | Yes | Yes | Random number generated by the host for the requests and copied to response by the RPMB engine |
| Data | 256 bytes | Yes | Yes | Data to be written or read by signed access |
| Advanced RPMB Data | 4KB | Yes | Yes | Data to be written or read by signed access in advanced RPMB operation |
| Block Count | 2 bytes | Yes | Yes | Number of 256-byte logical blocks requested to be read or programmed |
| Advanced RPMB Block Count | 2 bytes | Yes | Yes | Number of 4Kbytes (advanced RPMB data) requested to be read or programmed |

FIG. 10

RPMB UNIT DESCRIPTOR

| Offset | Size | Name | MDV | User Conf. | Description |
|---|---|---|---|---|---|
| 09h | 1 | bRPMBRegionEnable | 00h | Yes | RPMB Region Enable<br><br>Bit-0: RPMB Region 0 is always enabled independent of this bit value<br>Bit-1: If set to 1, RPMB region1 is enabled.<br>Bit-2: If set to 1, RPMB region2 is enabled.<br>Bit-3: If set to 1, RPMB region 3 is enabled.<br>Bit-4: If set to 1, Advanced RPMB mode is enabled.<br>Bit-5 to Bit 7: Reserved |

FIG. 11

| | | DEVICE DESCRIPTOR | | |
|---|---|---|---|---|
| Offset | Size | Name | MDV | User Conf. | Description |
| 4Fh | 4 | dExtendedUFSFeatureSupport | Device specific | No | Extended UFS Features Support<br><br>bit[0]: Field Firmware Update (FFU)<br>bit[1]: Production State Awareness (PSA)<br>bit[2]: Device Life Span<br>bit[3]: Refresh Operation<br>bit[4]: TOO_HIGH_TEMPERATURE<br>bit[5]: TOO_LOW_TEMPERATURE<br>bit[6]: Extended Temperature<br>bit[7]: Reserved for Host-aware Performance Booster (HPB)<br>bit[8]: WriteBooster<br>bit[9]: Performance Throttling<br>bit[10]: 2nd Access Mode<br>bit[11-31]: Reserved |

FIG. 12

| Result Code | |
|---|---|
| Code | Description |
| 0000h (0080h) | Operation OK |
| 0001h (0081h) | General failure |
| 0002h (0082h) | Authentication failure |
| 0003h (0083h) | Counter failure |
| 0004h (0084h) | Address failure |
| 0005h (0085h) | Write failure |
| 0006h (0086h) | Read failure |
| 0007h | Authentication Key not yet programmed |
| 0008h (0088h) | Secure Write Protect Configuration Block access failure |
| 0009h (0089h) | Invalid Secure Write Protect Block Configuration parameter |
| 000Ah (008Ah) | Secure Write Protection not applicable |

FIG. 15

RPMB Message of Authenticated Data Write Request

| Offset | Field Name | Value |
|---|---|---|
| 0:195 | Stuff Bytes | 0...00h |
| 196:227 | MAC | MAC from the host |
| 228:483 | Data | Data |
| 484:499 | Nonce | 0...00h |
| 500:503 | Write Counter | Current Counter value |
| 504:505 | Address | Address |
| 506:507 | Block Count | Number of 256B blocks |
| 508:509 | Result | 0000h |
| 510:511 | Request Message Type | 0003h |

AUTHENTICATION DATA: 196:227
METADATA: 500:503 through 510:511

FIG. 16

RPMB Message of Result Read Request

| Offset | Field Name | Value |
|---|---|---|
| 0:195 | Stuff Bytes | 0...00h |
| 196:227 | MAC | 0...00h |
| 228:483 | Data | 0...00h |
| 484:499 | Nonce | 0...00h |
| 500:503 | Write Counter | 0...00h |
| 504:505 | Address | 0000h |
| 506:507 | Block Count | 0000h |
| 508:509 | Result | 0000h |
| 510:511 | Request Message Type | 0005h |

AUTHENTICATION DATA: 196:227
METADATA: 500:503 through 510:511

FIG. 17

RPMB Message of Result Read Response

| | Offset | Field Name | Value |
|---|---|---|---|
| | 0:195 | Stuff Bytes | 0...00h |
| AUTHENTICATION DATA { | 196:227 | MAC | MAC from the storage device |
| | 228:483 | Data | 0...00h |
| | 484:499 | Nonce | 0...00h |
| | 500:503 | Write Counter | New Counter value |
| METADATA { | 504:505 | Address | Address |
| | 506:507 | Block Count | 0000h |
| | 508:509 | Result | Result Code |
| | 510:511 | Response Message Type | 0300h |

FIG. 19

RPMB Message of Authenticated Data Read Request

| Offset | Field Name | Value |
|---|---|---|
| 0:195 | Stuff Bytes | 0...00h |
| 196:227 | MAC | 0...00h |
| 228:483 | Data | 0...00h |
| 484:499 | Nonce | Nonce from the host |
| 500:503 | Write Counter | 0...00h |
| 504:505 | Address | Address |
| 506:507 | Block Count | Number of 256B blocks |
| 508:509 | Result | 0000h |
| 510:511 | Request Message Type | 0004h |

AUTHENTICATION DATA: 196:227
METADATA: 228:483 through 510:511

FIG. 20

RPMB Message of Authenticated Data Read Response

| Offset | Field Name | Value |
|---|---|---|
| 0:195 | Stuff Bytes | 0...00h |
| 196:227 | MAC | MAC from the storage device |
| 228:483 | Data | Data |
| 484:499 | Nonce | Copy of the Nonce |
| 500:503 | Write Counter | 0...00h |
| 504:505 | Address | Address |
| 506:507 | Block Count | Number of 256B blocks |
| 508:509 | Result | Result Code |
| 510:511 | Response Message Type | 0400h |

AUTHENTICATION DATA: 196:227
METADATA: 228:483 through 510:511

FIG. 22

| Command PIU | | | | | | | |
|---|---|---|---|---|---|---|---|
| 0 Transaction Type | | 1 Flags | | 2 LUN | | 3 Task Tag | |
| 4 Initiator ID | Command Set Type | 5 Reserved | | 6 Reserved | | 7 Reserved | |
| 8 Total EHS Length(02h) | | 9 Reserved | | 10 (MSB) Data Segment Length | | 11 (LSB) | |
| 12 (MSB) | | 13 | | 14 | | 15 (LSB) | |
| Expected Data Transfer Length | | | | | | | |

| Bit / Byte | 7 | 6 | 5 | 4 | 3 | 2 | 1 | 0 |
|---|---|---|---|---|---|---|---|---|
| 0 | OPERATION CODE (B5h) | | | | | | | |
| 1 | SECURITY PROTOCOL | | | | | | | |
| 2 | SECURITY PROTOCOL SPECIFIC (Region Info) | | | | | | | |
| 3 | | | | | | | | |
| 4 | Reserved | | | | | | | |
| 5 | Reserved | | | | | | | |
| 6 | ALLOCATION LENGTH (RPMB Data Size) | | | | | | | |
| 9 | | | | | | | | |
| 10 | Reserved | | | | | | | |
| 11 | CONTROL=00h | | | | | | | |
| 28 CDB[12]=00h | | | 29 CDB[13]=00h | | 30 CDB[14]=00h | | 31 CDB[15]=00h | |

EHS field:
| 0~3 | EHS Header |
|---|---|
| 4~5 | Request Message Type – 0003h |
| 6~21 | Nonce – Nonce from the host |
| 22~25 | Write Counter – Current Counter Value |
| 26~27 | Address – Address |
| 28~29 | Advanced RPMB Block Count – Number of Advanced RPMB Data Block |
| 30~31 | Result – 0000h |
| 32~63 | MAC from the host |

METADATA: rows 4~5 through 28~29
AUTHENTICATION DATA: row 32~63

FIG. 23

| | Response PIU | | | |
|---|---|---|---|---|
| 0 Transaction Type | 1 Flags | 2 LUN | 3 Task Tag | |
| 4 Initiator ID \| Command Set Type | 5 Reserved | 6 Reserved | 7 Reserved | |
| 8 Total EHS Length(02h) | 9 Reserved | 10 (MSB) Data Segment Length | 11 (LSB) | |
| 12 (MSB) | 13 | 14 | 15 (LSB) | |
| ⋮ | | | | |

EHS field:
| | | |
|---|---|---|
| 0~3 | EHS Header | |
| 4~5 | Response Message Type – 0300h | METADATA |
| 6~21 | Nonce – Copy of Nonce | |
| 22~25 | Write Counter – New Counter Value | |
| 26~27 | Address – Address | |
| 28~29 | Advanced RPMB Block Count – 0000h | |
| 30~31 | Result – Result Code | |
| 32~63 | MAC from the device | AUTHENTICATION DATA |

FIG. 25

| Command PIU |||||||||
|---|---|---|---|---|---|---|---|---|
| 0 Transaction Type || 1 Flags || 2 LUN || 3 Task Tag ||
| 4 Initiator ID | Command Set Type | 5 Reserved || 6 Reserved || 7 Reserved ||
| 8 Total EHS Length(02h) || 9 Reserved || 10 (MSB) Data Segment Length ||| 11 (LSB) |
| 12 (MSB) || 13 | 14 || 15 (LSB) |||
| Expected Data Transfer Length |||||||||

| Bit Byte | 7 | 6 | 5 | 4 | 3 | 2 | 1 | 0 |
|---|---|---|---|---|---|---|---|---|
| 0 | OPERATION CODE (A2h) ||||||||
| 1 | SECURITY PROTOCOL ||||||||
| 2 | SECURITY PROTOCOL SPECIFIC (Region Info) ||||||||
| 3 | ||||||||
| 4 | Reserved ||||||||
| 5 | Reserved ||||||||
| 6 | TRANSFER LENGTH ||||||||
| 9 | ||||||||
| 10 | Reserved ||||||||
| 11 | CONTROL=00h ||||||||
| 0~3 | EHS Header ||||||||
| 4~5 | Request Message Type – 0004h ||||||||
| 6~21 | Nonce – Nonce from the host ||||||||
| 22~25 | Write Counter – 0...00h ||||||||
| 26~27 | Address – Address ||||||||
| 28~29 | Advanced RPMB Block Count – Number of Advanced RPMB Data Block ||||||||
| 30~31 | Result – 0000h ||||||||
| 32~63 | MAC – 0...00h ||||||||

EHS field: bytes 0~3 to 32~63

METADATA: bytes 4~5 to 28~29

AUTHENTICATION DATA: bytes 32~63

STORAGE DEVICE, COMPUTING SYSTEM, AND METHOD FOR ACCESSING TO SECURE STORAGE AREA BASED ON ACCESS MODE

CROSS-REFERENCE TO RELATED APPLICATION

The present application claims priority under 35 U.S.C. § 119(a) to Korean patent application number 10-2021-0150052 filed on Nov. 3, 2021 and Korean patent application number 10-2022-0064212 filed on May 25, 2022, the entire disclosures of which are incorporated by reference herein.

BACKGROUND

Field of Invention

The present disclosure relates to an electronic device, and more particularly, to a storage device, a computing system, and a method of operating the same.

Description of Related Art

With recent remarkable development of information communication technology, semiconductor technology, and the like, dissemination and use of various electronic devices are rapidly increasing. In particular, recent electronic devices may be portable and communicate, provide various services using an application, and transmit and receive various data to and from an external electronic device or an external server.

The electronic device may include at least one processor and operating system (OS) to provide various services, the OS of the electronic device is strategically opened by a major manufacturer and a major supplier, and an application program interface, a software development kit, and a source file are open to an ordinary person.

However, according to a use of such an open operating system, security of data of the electronic device is weakening, and in fact, a case such as damaging or hacking the data of the electronic device using various malicious codes frequently occurs. Therefore, recently, various methods for protecting the data of the electronic device have been sought.

SUMMARY

An embodiment of the present disclosure provides a storage device providing an improved security function, a computing system, and a method of operating the same.

According to an embodiment of the present disclosure, a storage device may include a memory device including a secure storage area for storing therein data to be accessed according to authentication; an access mode memory configured to store therein information of device access mode regarding an operation mode for the secure storage area; and a memory controller configured to receive a command regarding the secure storage area from an external host and process the command according to whether information of host access mode included in the command matches the information of the device access mode.

According to an embodiment of the present disclosure, a method of operating a storage device comprising a memory device including a secure storage area for storing data to be accessed according to authentication, an access mode memory configured to store therein information of device access mode regarding an operation mode for the secure storage area of the storage device, and a memory controller configured to process a command received from an external host, may include receiving a command regarding the secure storage area from the external host; identifying, based on the command, a host access mode indicating an operation mode for the secure storage area of the external host within the memory device; and comparing the host access mode and the device access mode.

According to an embodiment of the present disclosure, a computing system may include a storage device comprising a memory device including a secure storage area for storing therein data to be accessed according to authentication; an access mode memory configured to store therein information of device access mode regarding an operation mode for the secure storage area; and a memory controller configured to control the memory device and the access mode memory; and a host device configured to provide a command regarding the secure storage area to the storage device, wherein the memory controller is further configured to process the command according to whether information of host access mode included in the command matches the information of the device access mode.

According to an embodiment of the present disclosure, an operating method of an authenticator may include accessing, in response to a request, a storage area according to first information when the first information is the same as second information; and rejecting the request when the first information is different from the second information, wherein the first information is provided together with the request, wherein the second information is pre-stored in the authenticator, and wherein each of the first and second information represents a scheme to authenticate the request.

According to the present technology, a storage device providing an improved security function, a computing system, and a method of operating the same are provided.

BRIEF DESCRIPTION OF THE DRAWINGS

FIG. 8 is a diagram illustrating a configuration of a response PIU according to an embodiment of the present disclosure.

FIG. 9 is a diagram illustrating a replay protected memory block (RPMB) message according to an embodiment of the present disclosure.

FIG. 10 is a diagram illustrating an RPMB unit descriptor stored in a storage device according to an embodiment of the present disclosure.

FIG. 11 is a diagram illustrating a device descriptor stored in a storage device according to an embodiment of the present disclosure.

FIG. 12 is a diagram illustrating a result code included in the RPMB message according to an embodiment of the present disclosure.

FIG. 15 is a diagram illustrating the RPMB message provided through operation S1405 of FIG. 14 according to an embodiment of the present disclosure.

FIG. 16 is a diagram illustrating the RPMB message provided through operation S1413 of FIG. 14 according to an embodiment of the present disclosure.

FIG. 17 is a diagram illustrating the RPMB message provided through operation S1419 of FIG. 14 according to an embodiment of the present disclosure.

FIG. 19 is a diagram illustrating the RPMB message provided through operation S1805 of FIG. 18 according to an embodiment of the present disclosure.

FIG. 20 is a diagram illustrating the RPMB message provided through operation S1811 of FIG. 18 according to an embodiment of the present disclosure.

FIG. 22 is a diagram illustrating a structure of the command PIU transferred in operation S2101 of FIG. 21 according to an embodiment of the present disclosure.

FIG. 23 is a diagram illustrating a structure of a response PIU transferred in operation S2107 of FIG. 21 according to an embodiment of the present disclosure.

FIG. 25 is a diagram illustrating a structure of the command PIU transferred in operation S2401 of FIG. 24 according to an embodiment of the present disclosure.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
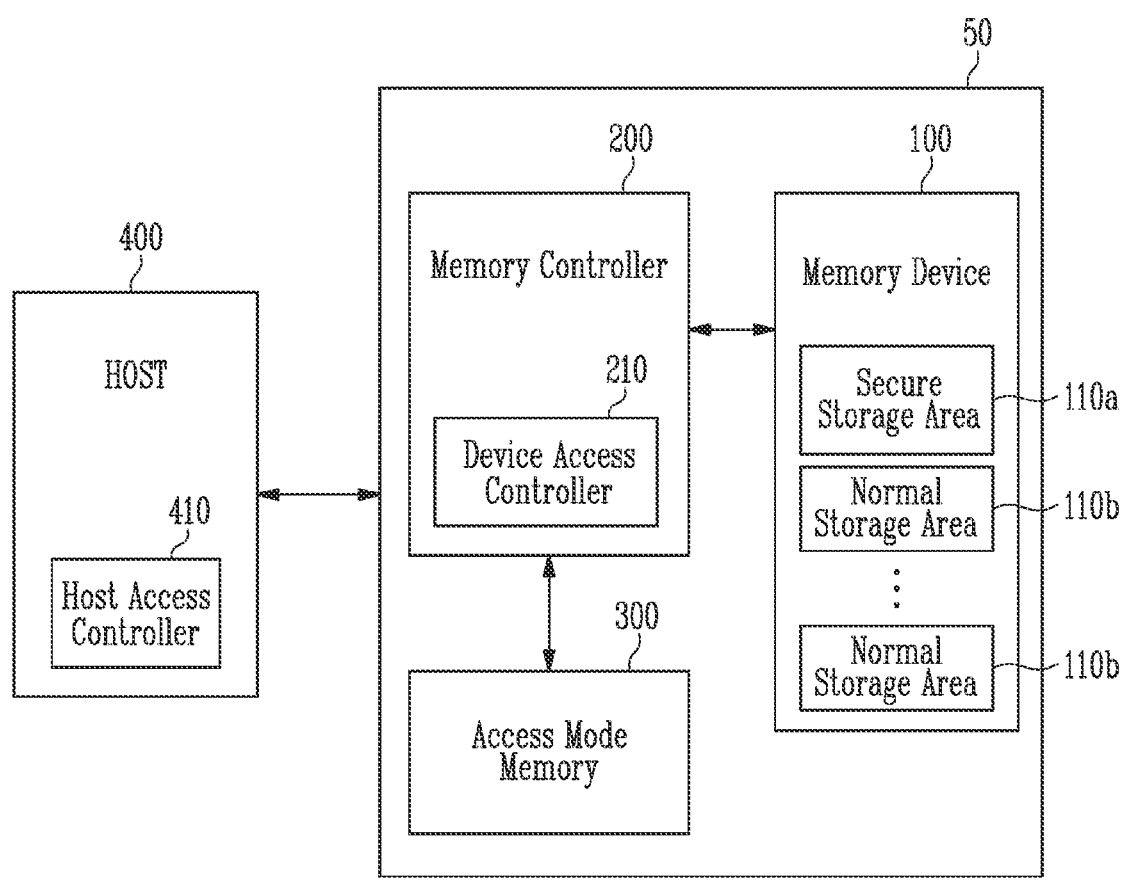
FIG. 1 is a diagram illustrating a computing system according to an embodiment of the present disclosure.

FIG. 1 is a diagram illustrating a computing system according to an embodiment of the present disclosure.

Referring to FIG. 1, the computing system may include a storage device 50 and a host 400. The storage device 50 may include a memory device 100, a memory controller 200, and an access mode memory 300. The storage device 50 may be a device that stores data under control of the host 400 such as a cellular phone, a smartphone, an MP3 player, a laptop computer, a desktop computer, a game player, a TV, a tablet PC, or an in-vehicle infotainment system. Alternatively, the storage device 50 may be a device that stores data under the control of the host 400 that stores high-capacity data in one place, such as a server or a data center.

The storage device 50 may be manufactured as one of various types of storage devices according to a host interface that is a communication method with the host 400. For example, the storage device 50 may be configured as any of various types of storage devices such as an SSD, a multi-media card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

The storage device 50 may be manufactured as any of various types of packages. For example, the storage device 50 may be manufactured as any of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits The memory cell array (not shown) may include a plurality of memory blocks. Each memory block may include a plurality of pages. In an embodiment, the page may be a unit for storing data in the memory device 100 or reading data stored in the memory device 100. The memory block may be a unit for erasing data.

The memory blocks included in the memory device 100 may include a secure storage area 110a in which access is limited and a normal storage area 110b. The secure storage area 110a may be an area for storing therein data to be accessed according to authentication. An additional condition or procedure may be further required to access the secure storage area 110a. For example, access to the secure storage area 110a may be possible only when the storage device 50 receives a predetermined specific command or passes authentication performed by the memory controller 200. In an embodiment, the secure storage area 110a may be a replay protected memory block (RPMB). The normal storage area 110b may be a memory block that may be accessed without separate authentication. The normal storage area 110b may be a memory block that stores data except for the data stored in the secure storage area 110a.

In the present specification, for convenience of description, the secure storage area 110a may be described as the RPMB, but embodiments of the present disclosure are not limited to an embodiment in which the secure storage area 110a is the RPMB, and may be applied to all types of memory blocks of which an access method is different from that of the normal storage area 110b.

In a method of accessing the secure storage area 110a, two or more modes of which access speeds are different may exist. For example, a first access mode in which security for the secure storage area 110a is relatively strict and a second access mode in which an access speed for the secure storage area 110a is relatively fast may exist. In a case of the second access mode, the access speed for the secure storage area 110a may be improved by performing a relatively fewer authentication procedure compared to the first access mode.

For example, when the storage device 50 supports the RPMB, the RPMB may be accessed according to at least two or more modes. For example, the RPMB may be accessed in any mode of a normal RPMB mode or an advanced RPMB mode.

In the present specification, the normal RPMB mode may be referred to as an example of the first access mode of which the access speed for the secure storage area 110a is relatively slow, and the advanced RPMB mode may be referred to as an example of the second access mode of which the access speed for the secure storage area 110a is relatively fast.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command and an address from the memory controller 200 and access an area selected by the address in the memory cell array. The memory device 100 may perform an operation instructed by the command on the area selected by the address. For example, the memory device 100 may perform a write operation (program operation), a read operation, and an erase operation. During the program operation, the memory device 100 may program data in the area selected by the address. During the read operation, the memory device 100 may read data from the area selected by the address. During the erase operation, the memory device 100 may erase data stored in the area selected by the address.

The memory controller 200 may control an overall operation of the storage device 50.

When power is applied to the storage device 50, the memory controller 200 may execute firmware such as a flash translation layer (FTL) for controlling communication between the host 400 and the memory device 100.

In an embodiment, the memory controller 200 may receive data and a logical block address (LBA) from the host 400 and may convert the LBA into a physical block address (PBA) indicating an address of memory cells in which data included in the memory device 100 is to be stored.

The memory controller 200 may control the memory device 100 to perform the program operation, the read operation, or the erase operation according to a request of the host 400. During the program operation, the memory controller 200 may provide a program command, the PBA, and data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate a command, an address, and data independently regardless of the request from the host 400 and transmit the command, the address, and the data to the memory device 100. For example, the memory controller 200 may provide the command, the address, and the data for performing a program operation, a read operation, and an erase operation accompanying in performing wear leveling, read reclaim, garbage collection, and the like, to the memory device 100.

In an embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other.

The access mode memory 300 may store therein various pieces of information provided by commands transferred between the host 400 and the storage device 50. For example, information of device access mode regarding an operation mode for the secure storage area 110a of the storage device 50 may be included. For example, the information of device access mode may indicate an access method of the storage device 50 to the secure storage area 110a. Specifically, the information of device access mode may indicate information regarding one or more access modes supported by the storage device 50 or information regarding an access mode currently activated in the storage device 50. In an embodiment, such information may be stored in a form of a descriptor. In FIG. 1, the access mode memory 300 is shown as a separate configuration from the memory device 100 and the memory controller 200, but the access mode memory 300 is not limited thereto, and may be a partial storage area in the memory device 100 or the memory controller 200. In an embodiment, the access mode memory 300 may be a register. This is described in more detail with reference to FIGS. 10 and 11 to be described later.

The memory controller 200 may identify a device access mode based on the information of device access mode stored in the access mode memory 300. In addition, the memory controller 200 may identify a host access mode for the secure storage area 110a of the host 400 based on an access request for the secure storage area 110a provided by the host 400, that is, a command, and may compare the device access mode and the host access mode. The host access mode may be identified based on information of host access mode in the command provided by the host, and the information of host access mode may include information regarding an operation mode for the secure storage area provided by the host.

When the device access mode and the host access mode match, the memory controller 200 may access the secure storage area 110a according to the request from the host 400. When the device access mode and the host access mode do not match, the memory controller 200 may fail the request of the host 400. When the request of the host 400 is failed, access to the secure storage area 110a may be no longer performed, or information indicating that the request of the host 400 is failed, that is, error information may be provided to the host.

The device access mode and the host access mode may be the first access mode of which the access speed is relatively slow or the second access mode of which the access speed is relatively fast, respectively. When the device access mode is the first access mode, the memory controller 200 may obtain information required for authentication from a command received after a command regarding the secure storage area 110a. When the device access mode is the second access mode, the memory controller 200 may obtain the information required for the authentication from the command regarding the secure storage area 110a. At this time, the information required for the authentication may mean one or more of various types of information required for performing authentication. For example, all information indicating a command related to access to the secure storage area 110a, an authentication code for performing authentication, all types of information for generating an authentication code, and the like may be the information required for the authentication.

In an embodiment, when the secure storage area 110a is the RPMB, the first access mode and the second access mode may be the normal RPMB mode and the advanced RPMB mode, respectively. In a case of the normal RPMB mode, a host RPMB message may be included in a data out command provided from the host 400 and may be provided to the storage device 50. The data out command may be provided after the host 400 provides a command requesting access to the RPMB. In a case of the advanced RPMB mode, the host RPMB message may be included in a command requesting access to the RPMB provided from the host and may be provided to the storage device 50. This is described in more detail with reference to FIGS. 14 to 26 to be described later.

The host 400 may communicate with the storage device 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

In the present specification, for convenience of description, the storage device 50 and the host 400 perform data communication according to an UFS communication interface, but embodiments of the present disclosure are not limited to performing the data communication according to the UFS communication interface. Specifically, the storage device 50 and the host 400 may perform the data communication using a command defined as a protocol information unit (PIU). The PIU may be a type of data packet generated according to a predetermined protocol. Therefore, in the present specification, the PIU is only a form of the command transferred between the storage device 50 and the host 400, and thus the command and the PIU may have the same meaning.

The command may be requesting, instructing, or responding from the host 400 or the storage device 50 to perform any operation. In an embodiment, various commands may be defined according to use and purpose. For example, all of query request, command, response, data out, data in, and ready to transfer may be referred to as commands, and in an embodiment, the commands may be transmitted in a form of the PIU described above.

A size of the smallest unit of the PIU may be 32 bytes, and a maximum size of the PIU may be 65600 bytes. A format of the PIU may have different sizes according to a type thereof.

The host 400 may provide the command regarding the secure storage area 110a to the storage device 50, and the command may be, for example, a command requesting access to the secure storage area 110a. The command regarding the secure storage area 110a may include a common segment commonly included in commands transferred between an external host and the memory controller, a unique field including a unique value according to a type of the commands, and an extra segment which is a segment except for the common segment. Here, the common segment may include information indicating a length of the extra segment.

The memory controller 200 may identify the host access mode based on one or more of the common segment and the extra segment of the command. Specifically, the host access mode may be identified based on at least one of the information indicating the length of the extra segment included in the common segment and whether the information required for the authentication is included in the extra segment. For example, when the length of the extra segment is 0 or the information required for the authentication is not included in the extra segment, the memory controller 200 may identify that the host access mode is the first access mode. Alternatively, when the length of the extra segment is not 0 or the information required for the authentication is included in the extra segment, the memory controller 200 may identify that the host access mode is the second access mode.

When the command is provided in the form of the PIU, the command regarding the secure storage area 110a, more specifically, the command requesting access to the secure storage area 110a may be provided in a form of a command PIU. At this time, the common segment may mean a basic header segment, the unique field may mean a transaction specific field, and the extra segment may mean an extra header segment. In addition, the basic header segment may include a total extra header segment length field including length information of the extra header segment. This is described in more detail with reference to FIGS. 5 to 8.

The memory controller 200 may include a device access controller 210.

The device access controller 210 may process the access request of the host 400 to the secure storage area 110a.

For example, when the secure storage area 110a is the RPMB, the device access controller 210 may process an authenticated data write operation of storing data in the RPMB and an authenticated data read operation of reading data stored in the RPMB. A specific method for the device access controller 210 to process the authenticated data write operation and the authenticated data read operation is described in more detail with reference to FIGS. 27 and 28 to be described later.

The host 400 may further include a host access controller 410.

The host access controller 410 may generate commands for controlling the secure storage area 110*a* and provide the commands to the device access controller 210. The host access controller 410 may receive a command from the device access controller 210.

The device access controller 210 and the host access controller 410 are described in more detail with reference to FIGS. 4, 27, and 28 to be described later.

Figure 2:
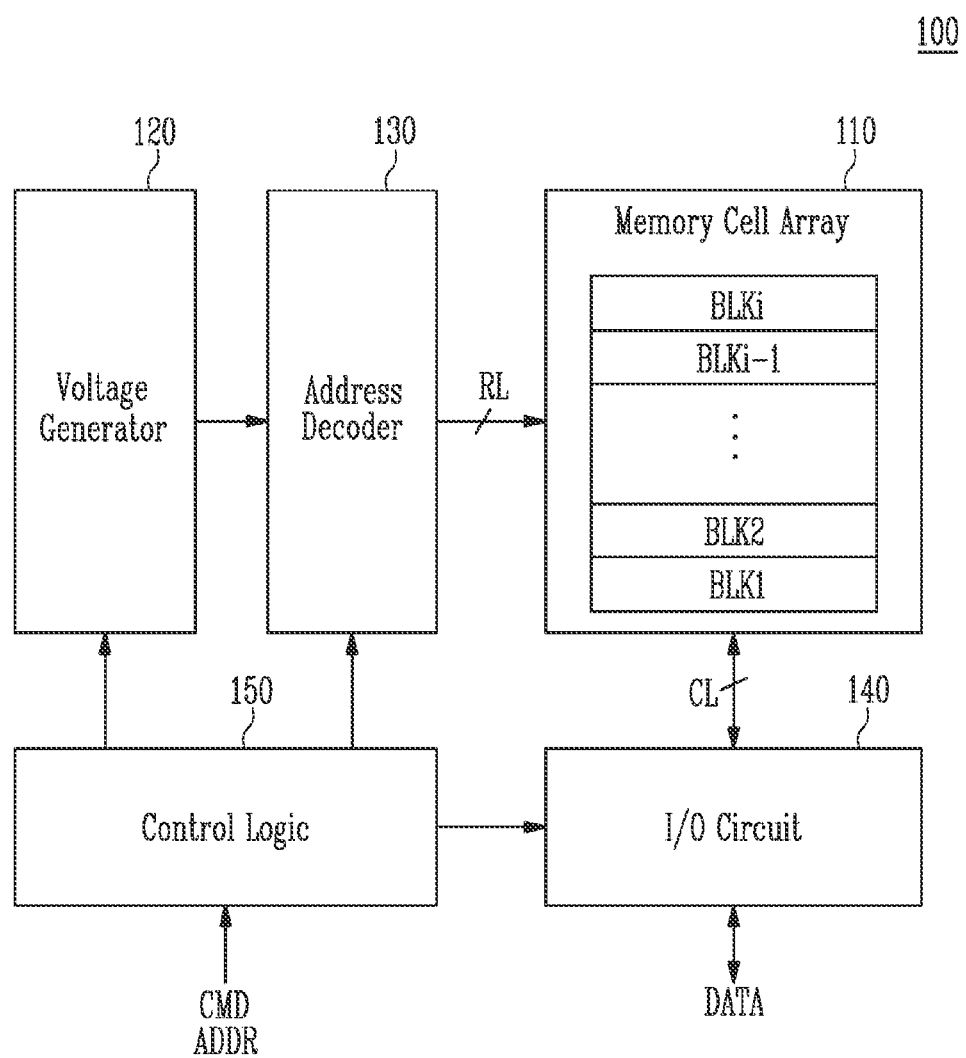
FIG. 2 is a diagram illustrating a memory device of FIG. 1 according to an embodiment of the present disclosure.

FIG. 2 is a diagram illustrating the memory device of FIG. 1 according to an embodiment of the present disclosure.

Referring to FIG. 2, the memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

A portion of the plurality of memory blocks BLK1 to BLKi may be the secure storage area 110*a* described with reference to FIG. 1, and a remaining portion may be the normal storage area 110*b*. In an embodiment, the secure storage area 110*a* may be the RPMB.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and the erase operation.

The voltage generator 120 is configured to generate a plurality of operation voltages using an external power voltage supplied to the memory device 100. The voltage generator 120 operates in response to the control of the control logic 150.

In an embodiment, the voltage generator 120 may generate an internal power voltage by regulating the external power voltage. The internal power voltage generated by the voltage generator 120 is used as an operation voltage of the memory device 100.

In an embodiment, the voltage generator 120 may generate the plurality of operation voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate control signals in response to the command CMD and the address ADDR to control the peripheral circuits.

Figure 3:
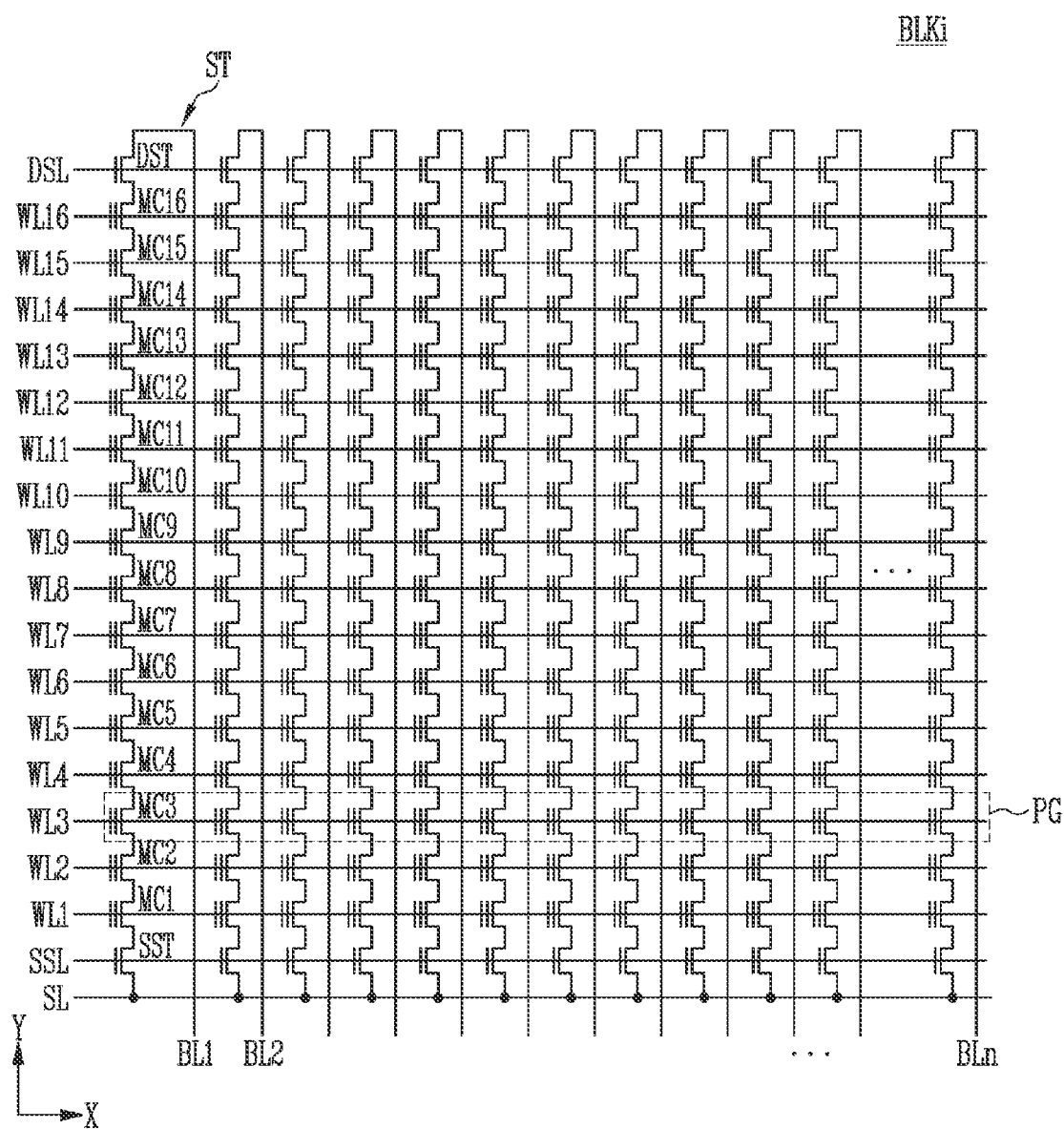
FIG. 3 is a diagram illustrating a configuration of one of the memory blocks of FIG. 2.

FIG. 3 is a diagram illustrating a configuration of one of the memory blocks of FIG. 2 according to an embodiment of the present disclosure.

The memory block BLKi is any one of the memory blocks BLK1 to BLKi of FIG. 2. The normal storage area or the secure storage area may be selected from among the memory blocks BLK1 to BLKi according to a request of the host.

Referring to FIG. 3, a plurality of word lines arranged in parallel with each other may be connected between a first select line and a second select line. Here, the first select line may be the source select line SSL, and the second select line may be the drain select line DSL. More specifically, the memory block 110 may include a plurality of strings ST connected between the bit lines BL1 to BLn and the source line SL. The bit lines BL1 to BLn may be connected to the strings ST, respectively, and the source line SL may be commonly connected to the strings ST. Since the strings ST may be configured to be identical to each other, a string ST connected to the first bit line BL1 is specifically described, as an example.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and may include a number of memory cells MC1 to MC16 which is more than the number shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a page PG. Therefore, the memory block BLKi may include pages PG for the number of the word lines WL1 to WL16.

One memory cell may store one bit of data. This is commonly called a single level cell (SLC). In this case, one physical page PG may store one logical page (LPG) data. The one logical page (LPG) data may include the same number of data bits as cells included in one physical page PG.

The one memory cell may store two or more bits of data. In this case, one physical page PG may store two or more logical page (LPG) data.

Figure 4:
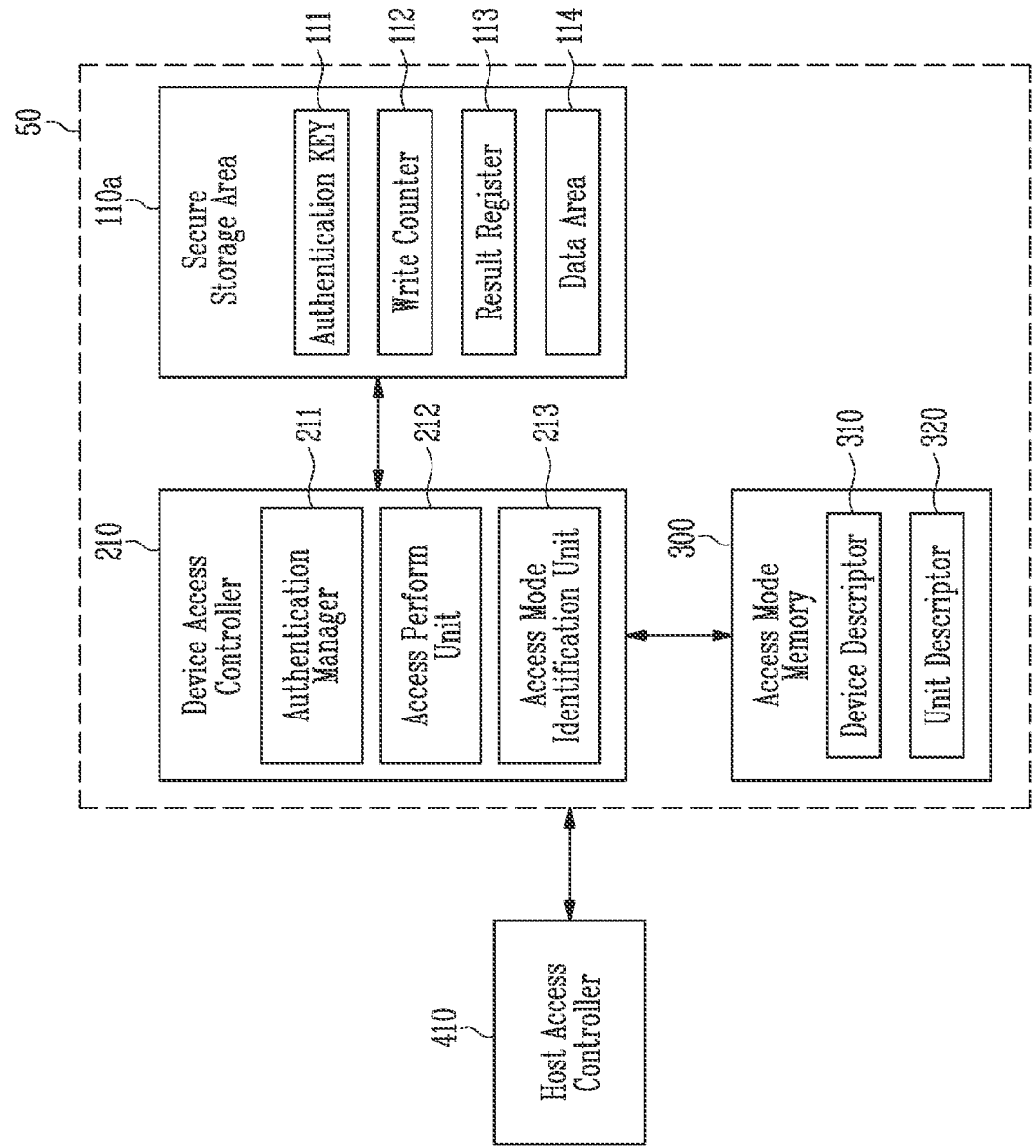
FIG. 4 is a diagram illustrating a computing system according to an embodiment of the present disclosure.

FIG. 4 is a diagram illustrating a computing system according to an embodiment of the present disclosure.

Hereinafter, in an embodiment of the present disclosure, in FIGS. 4 to 12 and 14 to 26, a case where the secure storage area 110a is the RPMB may be disclosed, but an embodiment of the present disclosure is not limited thereto, and the secure storage area may be various types of memory blocks in which access is limited.

In addition, in an embodiment of the present disclosure, in FIGS. 4 to 12 and 14 to 26, the command transferred between the storage device 50 and the host 400 is transmitted in the form of the PIU, an embodiment of the present disclosure is not limited thereto, and various communication methods may be adopted.

Referring to FIGS. 1 and 4, the storage device 50 may include the secure storage area 110a and the device access controller 210. The secure storage area 110a may be at least a portion of the storage area included in the memory device 100 described with reference to FIG. 1, and in an embodiment, the secure storage area 110a may be the RPMB. The device access controller 210 may be included in the memory controller 200, and the host access controller 410 may be included in the host 400.

The secure storage area 110a may include an authentication key 111, a write counter 112, a result register 113, and a data area 114.

The authentication key 111 may be a value stored in advance in the secure storage area 110a to be used during authentication for the access to the secure storage area 110a. For example, when the secure storage area 110a is the RPMB, the authentication key 111 may be stored only once for the first time, may not be read by itself, and access may be possible only when calculating a message authentication code (MAC) used to authenticate access to the RPMB. In an embodiment, the authentication key 111 may have a size of 32 bytes, but a size of the authentication key is not limited to 32 bytes.

The write counter 112 may count the number of times of access to the secure storage area 110a. The access to the secure storage area 110a may be allowed only within a preset number of times, and thus security may be improved. In an embodiment, when the secure storage area 110a is the RPMB, the write counter 112 may count the number of times the authenticated data write operation, which is an operation of storing data in the RPMB, is successfully performed. A value indicated by the write counter 112 or a value stored in the write counter 112 may be a write count value. The write counter 112 may store a write count value corresponding to 4 bytes, but may also store a write count value corresponding to data of a larger size. An initial write count value may be "0000 0000h". The write count value of the write counter 112 may not be reset or decreased. The write count value of the write counter 112 may not increase any more after reaching a maximum value of "FFFF FFFFh". Therefore, when the write count value of the write counter 112 reaches the maximum value, data may not be stored in the secure storage area 110a anymore, and the secure storage area 110a may operate as a storage area on which only read is possible.

The result register 113 may store a result of an operation performed on the secure storage area 110a. For example, when the secure storage area 110a is the RPMB, the result register 113 may store a result code indicating a result of an operation performed on the RPMB. At this time, a type of the result code stored in the result register is described in more detail with reference to FIG. 12.

In an embodiment, the authentication key 111, the write counter 112, and the result register 113 may be independently included for each distinct area in the secure storage area 110a, and may have a unique value. In various embodiments, the secure storage area 110a may be partitioned into a plurality of secure storage sub-areas. In an embodiment, when the secure storage area 110a is the RPMB, a maximum number of RPMB sub-areas included in the RPMB may be four. Each RPMB sub-area may have a unique authentication key and a write count value.

The data area may be an area in which data is stored only when the authentication is passed. In an embodiment, when the secure storage area 110a is the RPMB, a capacity of the data area (RPMB Data Area) may be a minimum of 128 Kbytes and a maximum of 16 Mbytes.

The device access controller 210 may further include an authentication manager 211, an access perform unit 212, and an access mode identification unit 213.

The access mode identification unit 213 may check whether the host access mode and the device access mode match prior to the access to the secure storage area 110a. That is, only when a method of accessing the secure storage area 110a provided by the storage device 50 matches a method of accessing the secure storage area 110a provided by the host 400, an access operation to the secure storage area 110a, such as authentication may be performed. The access mode identification unit 213 may identify the device access mode based on information stored in the access mode memory 300, and may identify the host access mode based on the command PIU from the host 400. Various descriptors provided from the host 400 may exist in the access mode memory 300, and may include, for example, a device descriptor 310 and a unit descriptor 320. The device descriptor 310 may include information on whether the storage device 50 supports the second access mode, and the unit descriptor 320 may include information on whether the second access mode is activated. The authentication manager 211 may identify the device access mode based on one or more of such information. For example, when the information included in the device descriptor indicates that the storage device 50 does not support the second access mode, the authentication manager 211 may identify the device access mode as the first access mode. Alternatively, when the information included in the device descriptor indicates that the storage device 50 supports the second access mode, the device access mode may be identified according to whether the second access mode included in the unit descriptor 320 is activated. In an embodiment, when the secure storage area 110a is the RPMB, the unit descriptor 320 may be an RPMB unit descriptor, and the second access mode may be the advanced RPMB access mode.

When a write operation on the secure storage area 110a is performed, the host access controller 410 may provide a message regarding the access to the secure storage area 110a to the device access controller 210 according to a predetermined format. Such a message may include information indicating a write request for the secure storage area 110a, metadata required for the authentication, authentication data required for the authentication, and the like. For example, when the secure storage area 110a is the RPMB, when the authenticated data write operation is performed, the host access controller 410 may provide an RPMB message to the device access controller 210 according to the predetermined format. The RPMB message provided by the host access controller 410 may include information required to perform authentication for the RPMB. For example, the RPMB message may include metadata required to perform authentication and authentication data required to perform authentication. The authentication data may include the MAC generated by the host access controller 410.

When the host access mode and the device access mode match, the authentication manager 211 may perform the authentication using the authentication key 111 stored in the secure storage area 110a. The authentication manager 211 may provide a result of performing the authentication to the access perform unit 212. The access perform unit 212 may store data in the secure storage area 110a or prohibit data from being stored in the secure storage area 110a according to the result of performing the authentication.

When the authentication is passed, the access perform unit 212 may control the secure storage area 110a so that data to be stored in the secure storage area 110a received from the host 400 is stored in the data area 114. When the data is successfully stored, the access perform unit 212 may increase the write count value stored in the write counter 112, and store a result of performing the write operation in the result register 113.

When the authentication fails, the access perform unit 212 may not store the data requested to be stored in the secure storage area 110a in the data area 114. The access perform unit 212 may maintain the value of the write counter 112 and store information indicating that the authentication is failed in the result register 113.

When the host access mode and the device access mode do not match, the authentication manager 211 may control to store information indicating an error without performing the authentication. In an embodiment, the information indicating the error may be stored in the result register 113 identical to a case where the authentication is failed, and then provided to the host access controller 410 as a response PIU to the command PIU. Alternatively, the information indicating the error may be stored in another position and then provided to the host access controller 410, or may be directly provided to the host access controller 410 without being separately stored.

When the host access mode and the device access mode match, when performing a data read operation on the secure storage area 110a, the host access controller 410 may provide a message related to the access to the secure storage area 110a to the device access controller 210 according to a predetermined format. The message may include information indicating a read request for the secure storage area 110a, the metadata required for the authentication, and the like.

The access perform unit 212 may read the data stored in the secure storage area 110a and generate a response message to be provided to the host access controller 410. The access perform unit 212 may generate metadata to be included in the response message. The metadata may be information required for authentication of the host access controller 410, and may include, for example, a portion of information included in the message received from the host access controller 410, the data read from the secure storage area 110a, a result code indicating a result of performing the read operation, and the like. In addition, the response message may further include authentication data required for the authentication. In an embodiment, when the secure storage area 110a is the RPMB, the access perform unit 212 may generate the MAC which is the authentication data using the authentication key 111 and metadata stored in the RPMB.

The access perform unit 212 may generate the response message including the authentication data and the metadata. The access perform unit 212 may provide the read data and the response message to the host access controller 410.

At this time, when the host access mode and the device access mode do not match, the authentication manager 211 may control the access perform unit 212 not to perform an authenticated data read operation itself. Alternatively the authentication manager 211 may control the access perform unit 212 not to generate the response message or not to provide the generated response message to the host access controller 410.

Figures 5, 6:
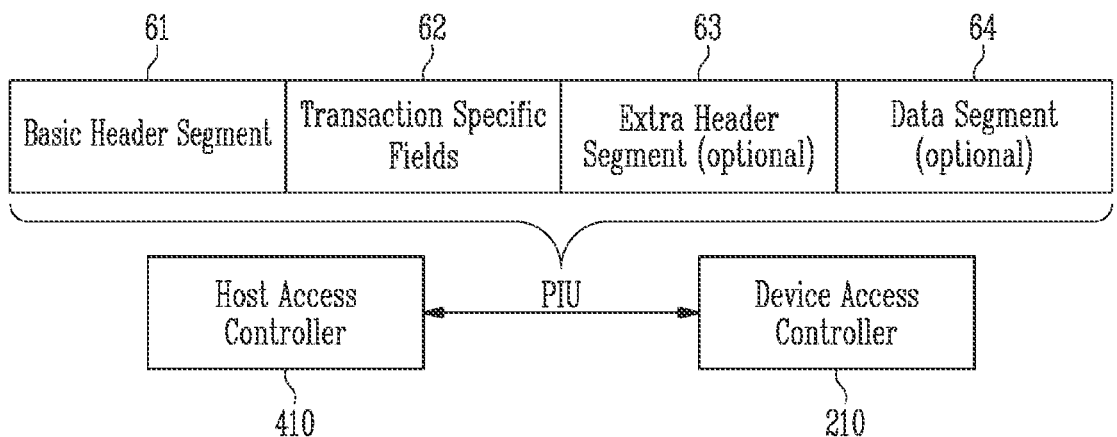
FIG. 5 is a diagram illustrating a data communication unit between a host access controller and a device access controller according to an embodiment of the present disclosure.
FIG. 6 is a diagram illustrating a structure of a basic header segment of a protocol information unit (PIU) according to an embodiment of the present disclosure.

FIG. 5 is a diagram illustrating a data communication unit between the host access controller and the device access controller according to an embodiment of the present disclosure.

Referring to FIGS. 1 and 5, the host access controller 410 and the device access controller 210 may communicate using data packets referred to as a protocol information unit (PIU). In terms of a physical device, the host access controller 410 is included in the host 400, and the device access controller 210 is included in the storage device 50. In terms of interfacing between two devices, one device may transmit the PIU to the other device. In this case, a device that generates the PIU may be referred to as an initiator device, and a device that receives the generated PIU may be referred to as a target device. That is, the PIU may be a data packet transmitted between two devices rather than a data packet unilaterally transmitted by one device of the host 400 or the storage device 50 to the other device.

The PIU may include a query request PIU, a command PIU, a response PIU, a data out PIU, a data in PIU, and a ready to transfer PIU according to an operation to be performed by the host access controller 410 or the device access controller 210.

The query request PIU may provide a device descriptor that provides various parameters of the storage device 50 to the storage device 50. The device descriptor may include information indicating whether the storage device 50 is the storage device 50 supporting the advanced RPMB mode.

In addition, in an embodiment, the query request PIU may include a unit descriptor. The unit descriptor may include information indicating whether the second access mode is activated. In an embodiment, the unit descriptor may be an RPMB unit descriptor, and at this time, the RPMB unit descriptor may include information indicating whether the advanced RPMB mode of the storage device 50 is activated. At this time, the RPMB unit descriptor may include an 8 bit RPMB region enable field (bRPMBRegionEnable) for setting RPMB regions included in the RPMB. In an embodiment, whether the storage device 50 currently supports access to the RPMB in the normal RPMB mode or the advanced RPMB mode may be determined using the RPMB region enable field (bRPMBRegionEnable).

The command PIU may be a PIU transmitted when the host 400 transfers a command to the storage device 50.

The response PIU may be a PIU transferred when the storage device 50 provides a response to the command provided by the host 400.

The data out PIU may be a PIU transmitted when the host 400 provides data to the storage device 50.

The data in PIU may be a PIU transmitted when the storage device 50 provides data to the host 400.

The ready to transfer PIU may be a PIU transmitted when the storage device 50 informs that the storage device 50 is ready to receive the data out PIU from the host 400. The ready to transfer PIU may be transmitted when the storage device 50 has a sufficient buffer space to store data provided by the host 400.

A size of the smallest PIU may be 32 bytes, and a maximum size of the PIU may be 65600 bytes. A format of the PIU may have different sizes according to a type thereof.

In an embodiment, the PIU may include a basic header segment 61, a transaction specific field 62, an extra header segment 63, and a data segment 64.

The basic header segment 61 may have a size of 12 bytes. The basic header segment 61 may be commonly included in all PIUs. The basic header segment 61 may include basic setting information related to the PIU.

The transaction specific field 62 may be included in a byte address 31 from a byte address 12 of the PIU. The transaction specific field 62 may include a dedicated transaction code according to the type of the PIU.

The extra header segment 63 may be defined when a total extra header segment length (Total EHS Length) field of the basic header segment 61 has a non-zero value. The extra header segment 63 may start from a byte address 32 of the PIU. The extra header segment 63 may be an area capable of additionally storing data when sufficient information may not be included in the basic header segment 61.

The data segment 64 may be included in the data out PIU or the data in PIU, and may not be included in other PIUs.

In an embodiment, the extra header segment 63 and the data segment 64 may not be included in all PIUs, but may be included only in a specific PIU.

FIG. 6 is a diagram illustrating a structure of the basic header segment of the PIU according to an embodiment of the present disclosure.

Referring to FIG. 6, the basic header segment 61 may include a transaction type, flags, a logical unit number (LUN), a task tag, an initiator ID, a command set type, a query function/task management function (Query Function, Task Manag. Function), a response, a status, a total extra header segment length (Total EHS Length), device information, and a data segment length.

The transaction type may have a unique value according to the type of the PIU. An example of the transaction type according to the type of the PIU is shown in [Table 1] below.

TABLE 1

| When initiator device provides to target device | Transaction type | When target device provides to initiator device | Transaction type |
|---|---|---|---|
| Command PIU | 00 0001b | Response PIU | 10 0001b |
| Data out PIU | 00 0010b | Data in PIU | 10 0010b |
| X | X | Ready to transfer PIU | 11 0001b |

The flags may be fields having different values according to the transaction type. The logical unit number may be a field indicating a number of a logical unit on which an operation is to be performed among a plurality of logical units included in an object on which the operation is to be performed. For example, each of the host 400 and the storage device 50 described with reference to FIG. 1 may include a plurality of logical units, and the logical unit number of the basic header segment 61 included in the PIU may indicate a specific logical unit among the plurality of logical units.

The task tag may be fields having different values according to the transaction type.

The initiator ID may be a field identifying who is an initiator requesting an operation. Therefore, the initiator ID may have different values in a case where the host generates the PIU and the storage device generates the PIU.

The command set type may be a field included in the command PIU and the response PIU. The command set type may be a field indicating which interface supports a command, such as whether the command is an SCSI command, a UFS command, or a command defined by a manufacturer.

The query function/task management function (Query Function, Task Manag. Function) may be a field input to the PIU such as a query request, a query response, or a task management request.

The response may be a field indicating whether performance of the requested operation is successful or failed.

The status may be a field indicating an SCSI status.

The total extra header segment length (Total EHS Length) may be a field indicating a size of the extra header segment in a 32 bit unit. The total extra header segment length (Total EHS Length) may be used when the PIU includes the extra header segment. A length of the extra header segment may be a 4 byte unit. A maximum size of the extra header segment may be 1024 bytes. When the extra header segment is not used, the total extra header segment length (Total EHS Length) may be 0.

The device information may include information used only when performing a specific function.

The data segment length may be a field indicating a length of a data segment of the PIU. When the PIU does not include the data segment, the data segment length may be 0.

Figure 7:
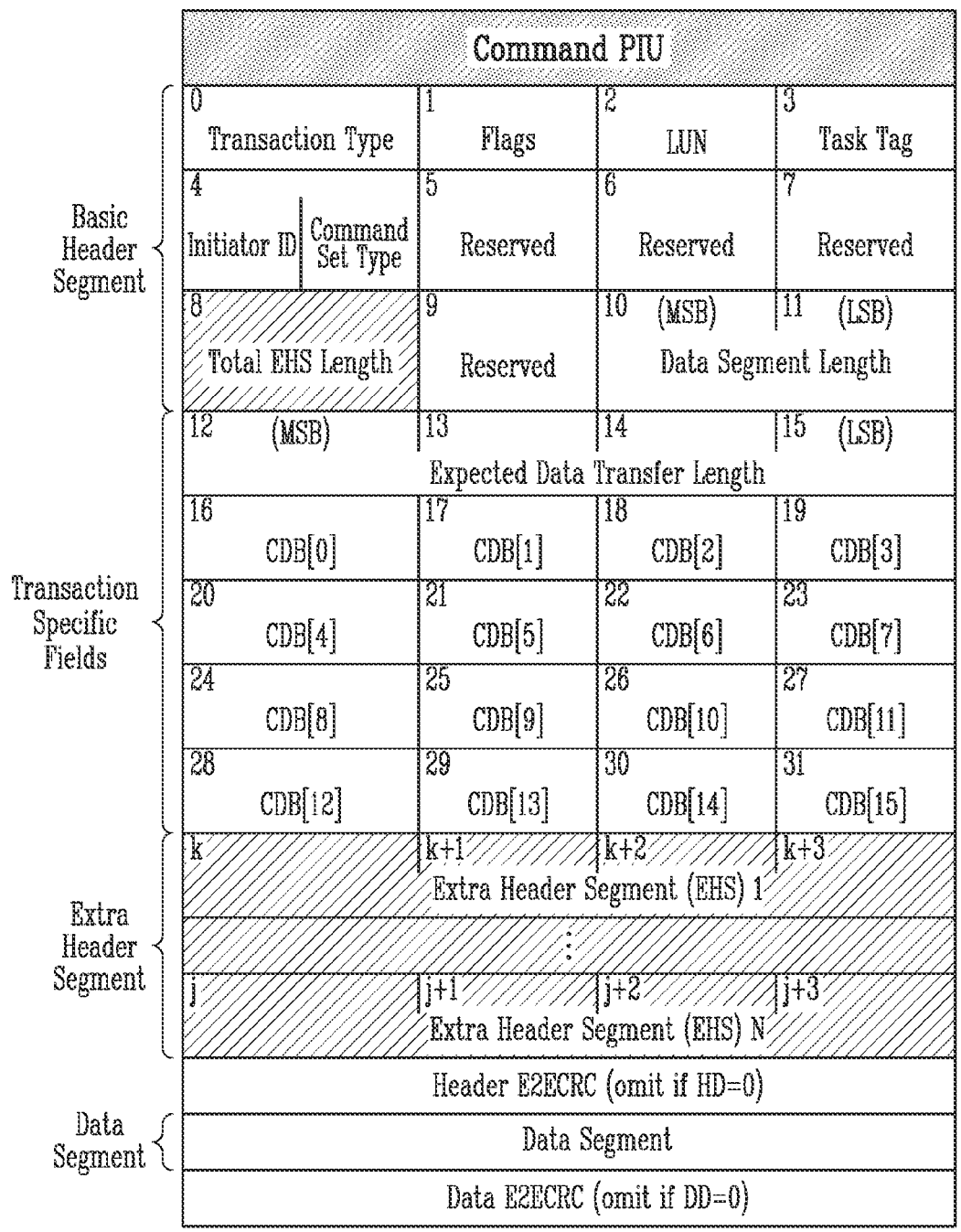
FIG. 7 is a diagram illustrating a configuration of a command PIU according to an embodiment of the present disclosure.

FIG. 7 is a diagram illustrating a configuration of the command PIU according to an embodiment of the present disclosure.

FIG. 8 is a diagram illustrating a configuration of the response PIU according to an embodiment of the present disclosure.

Referring to FIGS. 1, 7, and 8, the command PIU and the response PIU may include a basic header segment, a transaction specific field, an extra header segment, and a data segment. The basic header segment included in the command PIU and the response PIU may include a total extra header segment length (Total EHS Length) field. When the total extra header segment length (Total EHS Length) field has a non-zero value, the extra header segment field included in the command PIU and the response PIU may be used. The extra header segment may start from a byte address 32 of the PIU. The extra header segment may be an area capable of additionally storing data when sufficient information may not be included in the basic header segment.

In the advanced RPMB mode, the host 400 and the storage device 50 may transmit the RPMB message using the extra header segment included in the command PIU and the response PIU. Specifically, the host 400 and the storage device 50 may set the total extra header segment length (Total EHS Length) field included in the basic header segments of the command PIU and the response PIU to a non-zero value, and may transmit the RPMB message by including the RPMB message in the extra header segment.

The memory controller 200 may identify the host access mode by checking the total extra header segment length field or the extra header segment in the basic header segment of the command PIU received from the host 400. For example, the memory controller 200 may first check the total extra header segment length field of the command PIU. When the value of the total extra header segment length field is 0, it may be identified that the host access mode is normal RPMB mode. When the value of the total extra header segment length field is not 0, the extra header segment may be checked, and when the RPMB message exists in the extra header segment, it may be identified that the host access mode is the advanced RPMB mode. Alternatively, according to a case, when the value of the total extra header segment length field is not 0, it may be identified that the host access mode is the advanced RPMB mode without checking the extra header segment. Alternatively, the host access mode may be identified according to existence or absence of the RPMB message by directly checking the extra header segment without checking the total extra header segment length field.

FIG. 9 is a diagram illustrating the RPMB message according to an embodiment of the present disclosure.

Referring to FIGS. 1 and 9, when the host 400 or the storage device 50 transmits and receives the PIU related to the RPMB, the host 400 or the storage device 50 may transfer the RPMB message to each other. The RPMB message may include information for authentication.

The RPMB message may include a plurality of components. The RPMB message may include some or all of the plurality of components shown in FIG. 9 according to a situation in which the RPMB message is transferred.

A request message type may have a size of 2 bytes. The request message type may be a component indicating a type of a request to the RPMB. The request message type may be included in a request transmitted by the initiator device to the target device. An example of a code value that the request message type may have is shown in [Table 2] below.

TABLE 2

| Code | Request Message Types |
|---|---|
| 0001h | Authentication Key programming request |
| 0002h | Write Counter read request |
| 0003h | Authenticated data write request |
| 0004h | Authenticated data read request |

TABLE 2-continued

| Code | Request Message Types |
|---|---|
| 0005h | Result read request |
| 0006h | Secure Write Protect Configuration Block write request |
| 0007h | Secure Write Protect Configuration Block read request |
| Others | Reserved |

The authentication key programming request may be a request message type requesting to program the authentication key. The write counter read request may be a request message type requesting the write count value stored in the write counter. The authenticated data write request may be a request message type requesting to store data in the RPMB. The authenticated data read request may be a request message type requesting to read the data stored in the RPMB. The result read request may be a request message type requesting a performance result (a value stored in the result register) of an operation related to the RPMB. The RPMB message having these request message types may be examples of a message requesting the access to the secure storage area 110a. A response message type may have a size of 2 bytes. The response message type may be a component indicating a type of response. The response message type may not be included in the request transmitted by the initiator device to the target device, and may be included in a response transmitted by the target device to the initiator device. A code value that the response message type may have is shown in [Table 3] below.

TABLE 3

| Code | Response Message Types |
|---|---|
| 0100h | Authentication Key programming response |
| 0200h | Write Counter read response |
| 0300h | Authenticated data write response |
| 0400h | Authenticated data read response |
| 0500h | Revered |
| 0600h | Secure Write Protect Configuration Block write response |
| 0700h | Secure Write Protect Configuration Block read response |
| Others | Reserved |

The authentication key programming response may be a response message type indicating a response to the RPMB message requesting to program the authentication key. The write counter read response may be a response message type indicating the RPMB message that transmits the write count value stored in the write counter to the initiator device. The authenticated data write response may be a response message type indicating a response to the authenticated data write request requesting to store data in the RPMB. The authenticated data read response may be a response message type indicating a response to the authenticated data read request requesting to read the data stored in the RPMB. A result read response may be a response message type indicating a response to the result read request requesting the performance result (the value stored in the result register) of the operation related to the RPMB. The authentication key may have a size of 32 bytes. The authentication key may be an RPMB message component included in the PIU corresponding to the authentication key programming request when initially requesting programming to the RPMB. Therefore, the authentication key may be included only in the request transmitted by the initiator device to the target device.

The MAC may have a size of 32 bytes. The MAC may be included in the response transmitted by the target device to the initiator device as well as the request transmitted by the initiator device to the target device. The MAC may be an RPMB message component used for authentication.

A result may have a size of 2 bytes. The result may be a value stored in the result register included in the RPMB. Therefore, the result may be included in the response transmitted by the target device to the initiator device.

The write counter may have a size of 4 bytes. The write counter may indicate the total number of successfully performed authenticated data write operations. The write counter may be the write count value stored in the write counter included in the RPMB. The write counter may be included in the response transmitted by the target device to the initiator device as well as the request transmitted by the initiator device to the target device.

An address may have a size of 2 bytes. The address may be data to be stored in the RPMB or a logical address of the data stored in the RPMB. The address may be included in the response transmitted by the target device to the initiator device as well as the request transmitted by the initiator device to the target device.

A nonce may have a size of 16 bytes. The nonce may be a value having randomness. The nonce may be included in the response transmitted by the target device to the initiator device as well as the request transmitted by the initiator device to the target device. In an embodiment, the nonce may be generated by the host 400, and the storage device 50 may copy and use the nonce generated by the host 400.

Data may be the data to be stored in the RPMB or the data read from the RPMB. The data may have a size of 256 bytes. In an embodiment, the data may be data transferred between the initiator device and the target device when the RPMB is accessed in the normal RPMB mode.

Advanced RPMB data may be the data to be stored in the RPMB or the data read from the RPMB in the advanced RPMB mode. The advanced RPMB data may be transmitted in a size of 4 KB unit. The advanced RPMB data may be the data to be stored in the RPMB according to the authenticated data write request, or the data read from the RPMB by the storage device 50 according to the authenticated data read request.

A block count may have a size of 2 bytes. The block count may be a value indicating the number of blocks of data transferred between the initiator device and the target device in the normal RPMB mode. In the normal RPMB mode, one block may have a size of 256 bytes.

An advanced RPMB block count may be a value indicating the number of blocks of the advanced RPMB data transferred between the initiator device and the target device in the advanced RPMB mode. In the advanced RPMB mode, one block may have a size of 4 KB.

Among the above-described message components, information directly used for the authentication, such as the MAC, may be referred to as the authentication data. In addition, among the above-described message components, information except for the authentication data such as the MAC may be referred to as the metadata. Since such metadata may also be used to generate the authentication data in the target device, for example, the MAC in the target device, the metadata may also be information indirectly used for the authentication. Therefore, both of the authentication data and the metadata may be information required for the authentication.

The message related to the access to the secure storage area 110a, such as the RPMB message described with reference to FIG. 9, may include some or all of the authentication data and the metadata. For example, the RPMB message components described with reference to FIG. 9 may be included in the RPMB message transferred between the host 400 and the storage device 50 or between the initiator device and the target device when the RPMB block is accessed in the normal RPMB mode or the advanced RPMB mode. The RPMB message components may be included in one PIU or may be divided and included in a plurality of PIUs according to a type of an operation.

FIG. 10 is a diagram illustrating an RPMB unit descriptor stored in a storage device according to an embodiment of the present disclosure. At this time, the RPMB unit descriptor is only described as an example of a unit descriptor including information on whether the second access mode is activated, and the unit descriptor that may be stored in the access mode memory 300 of FIG. 4 is not limited to the RPMB unit descriptor.

Referring to FIGS. 4 and 10, the RPMB unit descriptor may be provided to the storage device 50 from the host 400. RPMB regions included in RPMB may be defined according to the RPMB descriptor. The RPMB unit descriptor may include an 8 bit RPMB region enable field (bRPMBRegion-Enable) for setting the RPMB regions included in the RPMB. In an embodiment, whether the storage device 50 supports access to the RPMB in the normal RPMB mode or the advanced RPMB mode may be determined using the RPMB region enable field (bRPMBRegionEnable). In the RPMB region enable field, RPMB region 0 is always activated regardless of a value of BIT-0, when a value of BIT-1 is 1, RPMB region 1 is activated, when a value of BIT-2 is 1, RPMB region 2 is activated, and when a value of BIT-3 is 1, RPMB region 3 is activated. In addition, when a value of BIT-4 is 1, the advanced RPMB mode is activated, and when the value of BIT-4 is 0, the normal RPMB mode is activated. In an embodiment, the RPMB access method may be set to the normal RPMB mode or the advanced RPMB mode according to the RPMB region enable field (bRPMBRegionEnable).

The RPMB unit descriptor may be stored in the access mode memory 300 in the storage device 50. The memory controller may identify the device access mode based on the RPMB unit descriptor stored in the storage device 50, more specifically, BIT-4 of the RPMB region enable field (bRPM-BRegionEnable) in the RPMB unit descriptor.

FIG. 11 is a diagram illustrating a device descriptor stored in a storage device according to an embodiment of the present disclosure.

Referring to FIGS. 4 and 11, the device descriptor may be provided to the storage device 50 from the host 400. For example, the device descriptor may be provided through the query request PIU. The device descriptor may provide various parameters of the storage device 50. The device descriptor may include information indicating whether the storage device 50 is the storage device 50 supporting the second access mode. In an embodiment, the device descriptor may include an extended UFS function support field (dExtendedUFSFeatureSupport). This field indicates the functions supported by a device. bit[0] may indicate a field firmware update (FFU) function, bit[1] may indicate a production state awareness (PSA) function, bit[2] may indicate a device life span improvement function, bit[3] may indicate a refresh operation function, bit[4] may indicate a function of a case where a device temperature is too high (TOO_HIGH_TEMPERATURE), bit[5] may indicate a function of a case where the device temperature is too low (TOO_LOW_TEMPERATURE), bit[6] may indicate a function having an extended temperature range, bit[7] may indicate a reserved area for host-aware performance booster (HPB), bit[8] may indicate write booster (WriteBooster) function, bit[9] may indicate a performance throttling function, and bit[10] may indicate a second access mode function. When each bit is set to 1, each bit means that a function corresponding to the bit is supported. That is, bit[10] of the UFS function support field (dExtendedUFSFeatureSupport) may indicate whether the second access mode function is supported for the secure storage area 110a, and the memory controller may check this to identify the device access mode. For example, when bit[10] of the UFS function support field (dExtendedUFSFeatureSupport) is checked as 0, an access mode of a corresponding device may be the first access mode, and thus the access mode of the device may be identified as the first access mode. The device descriptor may be stored in the access mode memory 300 in the storage device 50. In an embodiment, when the secure storage area 110a is the RPMB, bit[10] of the UFS function support field (dExtendedUFSFeatureSupport) may indicate whether the advanced RPMB function is supported.

FIG. 12 is a diagram illustrating the result code included in the RPMB message according to an embodiment of the present disclosure.

Referring to FIGS. 4 and 12, a result of performing an operation performed on the RPMB may be stored in the result register 113. For example, the result register 113 may store the result code indicating the result of the operation performed on the RPMB. Looking at the result code according to FIG. 12, 0000h (0008h) is indicated when the operation performed on the RPMB is well performed, 0001h (0081h) is indicated for normal fail, 0002h (0082h) is indicated for authentication failure such as a case where an MAC comparison does not match or an MAC calculation is failed, 0003h (0083h) is indicated for counter failure such as a case where counters do not match when the counters are compared with each other, or a case where a counter increase is failed, 0004h (0084h) is indicated for address failure such as an address out of range or incorrect address alignment, 0005h (0085h) is indicated for write failure such as write failure of data/counter/result or the like, and 0006h (0086h) is indicated for read failure such as read failure of data/counter/result or the like. 0007h indicates that the authentication key is not yet programmed, and this value is valid only until the authentication key is programmed and is no longer used when the authentication key is programmed. In addition, 0008h (0088h) is indicated for failure of secure write protect configuration block access such as secure write protect configuration read or write failure, 0009h (0089h) is indicated in a case where a secure write protect block configuration parameter is invalid such as a case where the LUN or an inactive logical unit, a data length, the logical block address, the number of logical blocks, an overlapping area, or the like is invalid, 000Ah (008Ah) is indicated in a case where secure write protect is not applied such as a case where a logical unit is configured as another write protect mode. At this time, a result code value in parentheses means a value used when the write counter is expired.

These result codes may be provided from the storage device 50 to the host 400 by the response PIU to the command PIU. As a result of comparing the host access mode and the device access mode by the memory controller 200, when two RPMB modes do not match, it may be determined that the case corresponds to general failure, and 0001h (0081h) may be stored in the result register 113 as the result code, and such a result code may be provided to the host 400 by the response PIU.

Figure 13:
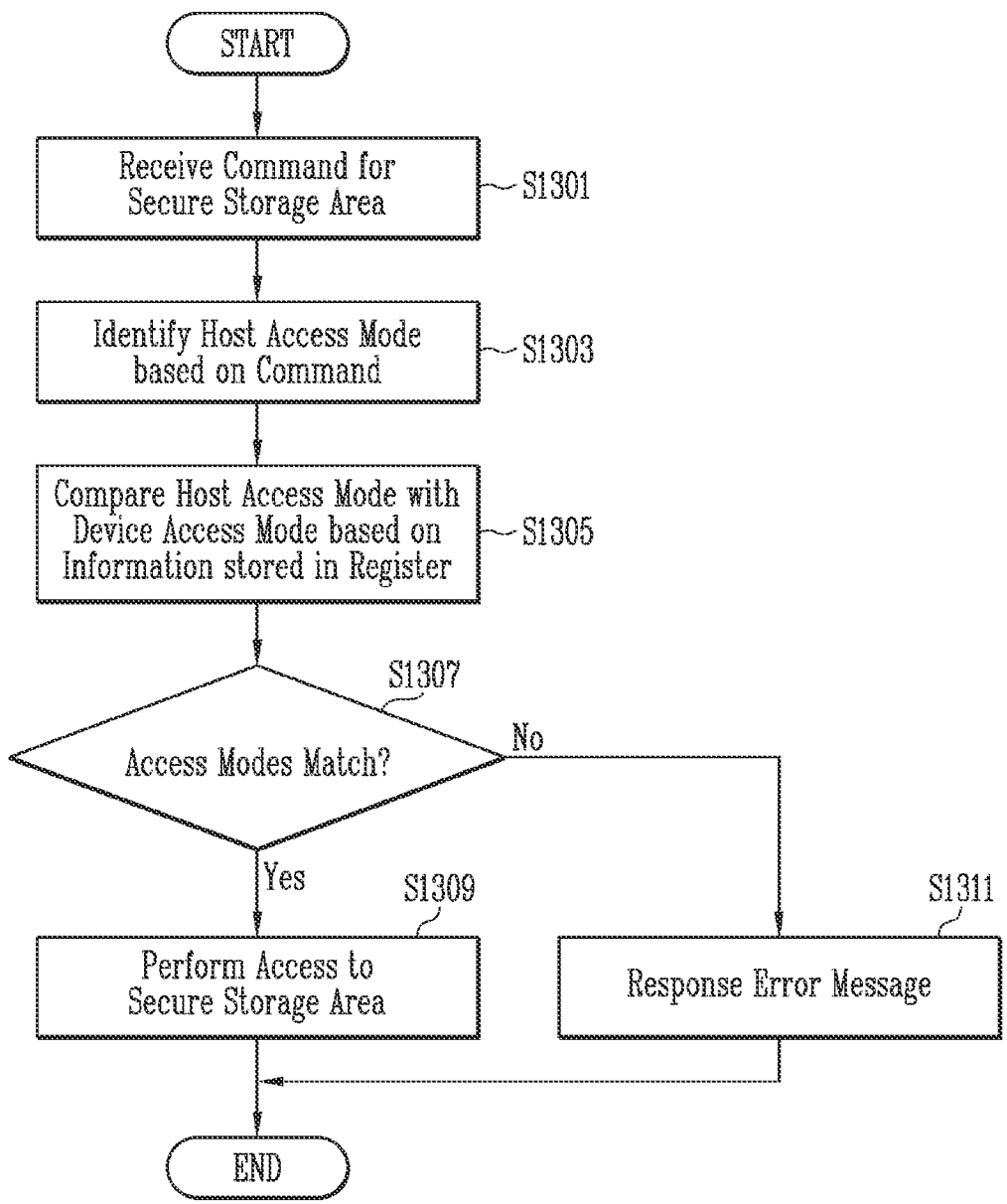
FIG. 13 is a flowchart illustrating a method of operating a storage device according to an embodiment of the present disclosure.

FIG. 13 is a flowchart illustrating a method of operating a storage device according to an embodiment of the present disclosure.

Referring to FIGS. 1, 4, and 13, the storage device 50 may receive a command in operation S1301. The command may be received from the host 400 and may be a command regarding the secure storage area 110a, or more specifically, a command requesting access to the secure storage area 110a.

Based on the received command, the memory controller 200 may identify the host access mode in operation S1303. In an embodiment, the host access mode may be identified by checking one or more of the total extra header segment length field and the extra header segment in the basic header segment of the command. For example, when the value of the total extra header segment length field in the basic header segment of the command is 0 or the extra header segment of the command does not include information required for the authentication, it may be identified that the host access mode is the first access mode. In addition, when the total extra header segment length field in the basic header segment of the command has a non-zero value or the extra header segment of the command includes the information required for the authentication, it may be identified that the host access mode is the second access mode.

Thereafter, the memory controller 200 may identify the device access mode based on the information of device access mode stored in the storage device 50, and may compare the identified host access mode and device access mode in operation S1305. The information of device access mode may be stored in the access mode memory 300 in the storage device 50. For example, when information indicating that the second access mode is not supported is stored in the device descriptor 310 stored in the access mode memory 300, or information indicating that the second access mode is deactivated is stored in the unit descriptor 320, it may be identified that the device access mode is the first access mode. In addition, when information indicating that the second access mode is supported is stored in the device descriptor 310 stored in the access mode memory 300 or information indicating that the second access mode is activated is stored in the unit descriptor 320, it may be identified that the device access mode is the second access mode.

When the two access modes match in operation S1307, that is, when both of the host access mode and the device access mode are the first access mode or both of the host access mode and the device access mode are the second access mode, access to the secure storage area access may be performed according to the matching access mode in operation S1309.

When the two access modes do not match in operation S1307, that is, when one of the host access mode and the device access mode is the first access mode and the other is the second access mode, an error message indicating an error may be provided to the host 400 in response to the command in operation S1311.

Figure 14:
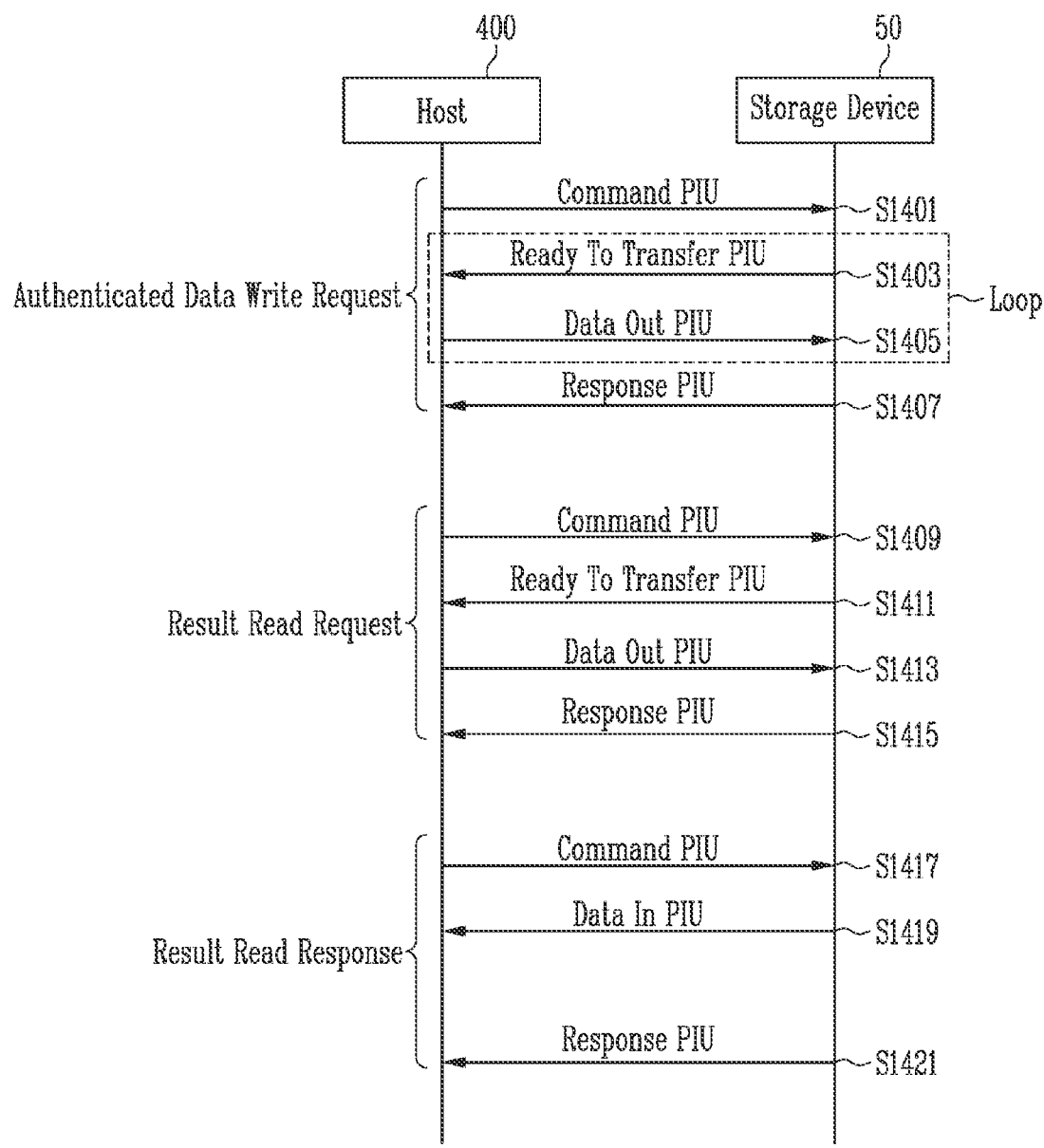
FIG. 14 is a flowchart illustrating an authenticated data write operation performed in a normal RPMB mode according to an embodiment of the present disclosure.

FIG. 14 is a flowchart illustrating the authenticated data write operation performed in the normal RPMB mode according to an embodiment of the present disclosure.

Referring to FIGS. 1, 4, and 14, in the normal RPMB mode, the host 400 may transfer the command PIU three times to perform the authenticated data write operation, and the storage device 50 may transfer the response PIU three times. The write operation according to the normal RPMB mode may be performed after the memory controller 200 checks that both of the host access mode and the device access mode match as the normal RPMB mode.

Specifically, the authenticated data write operation may include a process of transferring the RPMB messages of the authenticated data write request, the result read request, and the result read response through the PIU.

The authenticated data write request may be performed through operations S1401 to S1407, the result read request may be performed through operations S1409 to S1415, and the result read response may be performed through operations S1417 to S1421.

The authenticated data write request includes a process in which the host 400 transfers the RPMB message requesting to store the data in the RPMB and the data to be stored to the storage device 50.

The result read request may be a request for transferring the RPMB message requesting the value stored in the result register included in the RPMB in which the performance result of the authenticated data write operation is stored, from the host 400 to the storage device 50.

The result read response may be a response in which the storage device 50 transfers the RPMB message providing the value of the result register to the host 400.

In operation S1401, the host 400 may provide the command PIU to the storage device 50. The command PIU transferred in operation S1401 may be a security protocol out command indicating that the host 400 will transmit data. In operation S1403, the storage device 50 may provide the ready to transfer PIU to the host 400 in response to the command PIU received in operation S1401. The ready to transfer PIU may be a PIU provided when the storage device 50 is ready to receive the data to be provided by the host 400. In an embodiment, the ready to transfer PIU may be a PIU providing a message indicating that the storage device 50 is ready to receive the data out PIU.

In operation S1405, the host 400 may provide the data out PIU to the storage device 50. The data out PIU provided by the host 400 may include the RPMB message corresponding to the authenticated data write request. The RPMB message transferred in operation S1405 may include a stuff byte, the authentication data, and the metadata. The metadata may include data to be stored in the RPMB. Since FIG. 14 shows a case where the authenticated data write operation is performed in the normal RPMB mode, data may include a plurality of blocks having a size of 256 bytes. The RPMB message transferred in operation S1405 is described in more detail with reference to FIG. 15 to be described later.

In operation S1407, the storage device 50 may provide the response PIU to the host 400. The response PIU transmitted in operation S1407 may be a response to the command PIU transmitted in operation S1401.

In operation S1409, the host 400 may provide the command PIU to the storage device 50. The command PIU transferred in operation S1409 may be the security protocol out command indicating that the host 400 will transmit data. Thereafter, in operation S1411, the storage device 50 may provide the ready to transfer PIU to the host 400 in response to the command PIU received in operation S1409. The ready to transfer PIU may be a PIU provided when the storage device 50 is ready to receive the data to be provided by the host 400. In an embodiment, the ready to transfer PIU may be a PIU providing a message indicating that the storage device 50 is ready to receive the data out PIU.

In operation S1413, the host 400 may provide the data out PIU to the storage device 50. The data out PIU provided in operation S1413 may include the RPMB message corresponding to the result read request. In an embodiment, the RPMB message included in the data out PIU provided in operation S1413 is described in more detail with reference to FIG. 16 to be described later.

In operation S1415, the storage device 50 may provide the response PIU to the host 400. The response PIU transmitted in operation S1415 may be a response to the command PIU transmitted in operation S1409.

In operation S1417, the host 400 may provide the command PIU to the storage device 50. The command PIU provided in operation S1417 may be a security protocol in command indicating a command requesting data and information from the storage device 50.

In operation S1419, the storage device 50 may provide the data in PIU to the host 400. The data in PIU transferred in operation S1419 may include the RPMB message corresponding to the result read response. The RPMB message transferred in operation S1419 may include the stuff byte, the authentication data, and the metadata. The metadata may include an updated write count value and the value of the result register indicating the performance result of the authenticated data write operation. The RPMB message transferred in operation S1419 is described in more detail with reference to FIG. 17 to be described later.

In operation S1421, the storage device 50 may provide the response PIU to the host 400. The response PIU transmitted in operation S1421 may be a response to the command PIU transmitted in operation S1417.

FIG. 15 is a diagram illustrating the RPMB message provided through operation S1405 of FIG. 14 according to an embodiment of the present disclosure.

Referring to FIGS. 1, 4, 14, and 15, the RPMB message corresponding to the authenticated data write request may include the stuff byte, the authentication data, and the metadata.

The stuff byte may be a bit added to synchronize a predetermined data format or data communication. In an embodiment, a field corresponding to the stuff byte may be "0".

The authentication data included in the RPMB message corresponding to the authenticated data write request may be the MAC generated by the host access controller 410 described with reference to FIG. 4.

The metadata may include the data to be stored in the RPMB, the nonce, the current write count value, the address corresponding to the data, the number of blocks of data (here one block is 256 B), and the request message type indicating that the RPMB message is the authenticated data write request. In an embodiment, a field corresponding to the nonce may be "0".

FIG. 16 is a diagram illustrating the RPMB message provided through operation S1413 of FIG. 14 according to an embodiment of the present disclosure.

Referring to FIGS. 1, 4, 14, and 16, the RPMB message corresponding to the result read request may include the stuff byte, the authentication data, and the metadata.

In an embodiment, in the RPMB message corresponding to the result read request, only the request message type included in the metadata may have a value, and values of the remaining fields may be "0". The request message type may include a code value 0005h indicating that the RPMB message is the result read request.

FIG. 17 is a diagram illustrating the RPMB message provided through operation S1419 of FIG. 14 according to an embodiment of the present disclosure.

Referring to FIGS. 1, 4, 14, and 17, the RPMB message corresponding to the result read response may include the stuff byte, the authentication data, and the metadata.

The stuff byte may be a bit added to synchronize a predetermined data format or data communication. In an embodiment, the field corresponding to the stuff byte may be "0".

The authentication data included in the RPMB message corresponding to the result read response may be the MAC generated by the device access controller 210 described with reference to FIG. 4.

Specifically, the access perform unit 212 may generate the metadata to be included in the RPMB message, and generate the MAC using the generated metadata and the authentication key 111 stored in the RPMB.

The metadata may include the updated write count value, the address of data stored by the authenticated data write operation, the result code indicating the performance result of the authenticated data write operation, and "0300h" which is a response message type code indicating that the RPMB message is the authenticated data write response. Here, the address may be the same value as the address included in the RPMB message corresponding to the authenticated data write request described with reference to FIG. 15.

In an embodiment, the stuff byte, the data, the nonce, and the block count fields included in the RPMB message corresponding to the result read response may be "0".

Figure 18:
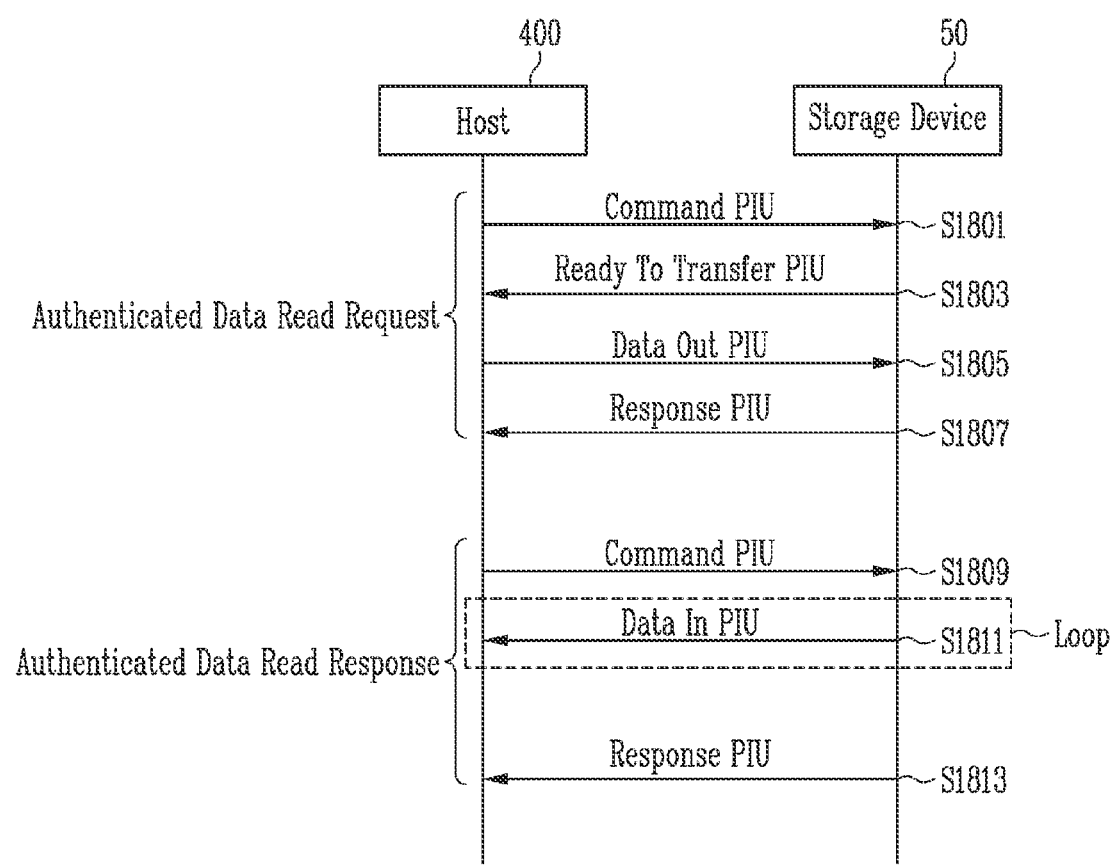
FIG. 18 is a flowchart illustrating an authenticated data read operation performed in the normal RPMB mode according to an embodiment of the present disclosure.

FIG. 18 is a flowchart illustrating the authenticated data read operation performed in the normal RPMB mode according to an embodiment of the present disclosure.

Referring to FIGS. 1, 4, and 18, in the normal RPMB mode, the host 400 may transfer the command PIU twice to perform the authenticated data read operation, and the storage device 50 may transfer the responds PIU twice. The read operation according to the normal RPMB mode may be performed after the memory controller 200 checks that both of the host access mode and the device access mode match as the normal RPMB mode.

Specifically, the authenticated data read operation may include a process of transferring the RPMB messages corresponding to each of the authenticated data read request and the authenticated data read response through the PIU.

The authenticated data read request may be performed through operations S1801 to S1807, and the authenticated data read response may be performed through operations S1809 to S1813.

The authenticated data read request includes a process in which the host 400 transfers the RPMB message indicating the read request for the data stored in the RPMB to the storage device 50, and the authenticated data read response includes a process in which the storage device 50 transfers the data read from the RPMB to the host 400.

In operation S1801, the host 400 may provide the command PIU to the storage device 50. The command PIU provided in operation S1801 may be the security protocol out command indicating that the host 400 will transmit data.

In operation S1803, the storage device 50 may provide the ready to transfer PIU to the host 400.

In operation S1805, the host 400 may provide the data out PIU to the storage device 50. The data out PIU provided in operation S1805 may include the RPMB message. Specifically, the RPMB message provided in operation S1805 may include the metadata. Here, the metadata includes the nonce generated by the host, the address to be read, the block count indicating the number of blocks of data to be read, and the request message type indicating that the RPMB message is the authenticated data read request. The RPMB message corresponding to the authenticated data read request is described in more detail with reference to FIG. 19 to be described later.

In operation S1807, the storage device 50 may provide the response PIU to the host 400. The response PIU provided by the storage device 50 may be a response to the command PIU transferred in operation S1801.

In operation S1809, the host 400 may provide the command PIU to the storage device 50. The command PIU provided in operation S1809 may be the security protocol in command indicating the command requesting data and information from the storage device 50.

In operation S1811, the storage device 50 may provide the data in PIU to the host 400. The data in PIU provided by the storage device 50 may include the RPMB message. Specifically, the RPMB message provided in operation S1811 may include the stuff byte, the authentication data, and the metadata. Here, the authentication data may be the MAC generated by the storage device 50. The metadata may include the data read from the RPMB, the nonce, the address, the block count indicating the number of blocks of the read data, and the response message type indicating that the RPMB message is the authenticated data read response. The RPMB message corresponding to the authenticated data read response is described in more detail with reference to FIG. 20 to be described later.

In operation S1813, the storage device 50 may provide the response PIU to the host 400. The response PIU received by the host 400 in operation S1813 may be a response to the command PIU transferred in operation S1809.

FIG. 19 is a diagram illustrating the RPMB message provided through operation S1805 of FIG. 18 according to an embodiment of the present disclosure.

Referring to FIGS. 1, 4, 18, and 19, the RPMB message corresponding to the authenticated data read request may include the metadata and the stuff byte without the authentication data. The stuff byte may be a bit added to synchronize a predetermined data format or data communication. In an embodiment, the field corresponding to the stuff byte may be "0".

The metadata may include the nonce generated by the host, the address to be read, the block count indicating the number of blocks of the data to be read, and the request message type indicating that the RPMB message is the authentication data read request.

In various embodiments, a value corresponding to each of the stuff byte, the MAC, the data, the write counter, and the result included in the RPMB message corresponding to the authenticated data read request may be "0".

FIG. 20 is a diagram illustrating the RPMB message provided through operation S1811 of FIG. 18 according to an embodiment of the present disclosure.

Referring to FIGS. 1, 4, 18, and 20, the RPMB message corresponding to the authenticated data read response may include the authentication data and the metadata. The authentication data may be the MAC generated by the device access controller 210 of the storage device 50. The metadata may include the data read from the RPMB, the nonce, the address, the block count indicating the number of blocks of the read data, and the response message type indicating that the RPMB message is the authenticated data read response.

The nonce may be the nonce included in the RPMB message corresponding to the authenticated data read request transferred through operation S1805, that is, a value obtained by copying a nonce value generated by the host 400 as it is. The address and the block count of the read data may be the same value as the address to be read and the block count indicating the number of blocks of the data to be read included in the RPMB message corresponding to the authenticated data read request. The result may be the result code indicating the performance result of the authenticated data read operation. The response message type may be a code 0400h indicating that the RPMB message is the authenticated data read response.

The host access controller 410 included in the host 400 may receive the RPMB message including the data read according to the authenticated data read operation, and then operate the MAC using the authentication key included in the host access controller 410 and the metadata included in the RPMB message. Only when the MAC calculated by the host access controller 410 and the MAC generated by the storage device 50 that is the authentication data included in the RPMB message, match, the host access controller 410 may obtain the read data.

As described through FIGS. 14 to 20, in the authenticated data write operation and the authenticated data read operation in the normal RPMB mode, the command PIU for providing the data to be stored or the read data is provided once, but provision of an extra command PIU or the response PIU may be additionally required to transfer the RPMB message. This may cause a delay of a speed of access to the RPMB, complexity of design, or the like.

Figure 21:
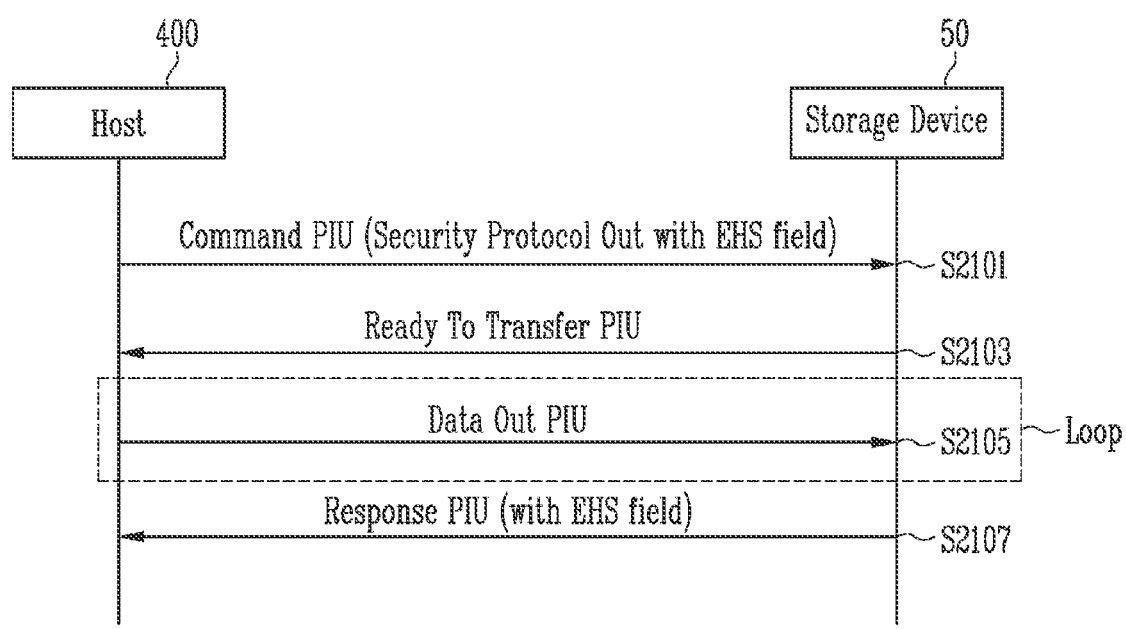
FIG. 21 is a flowchart illustrating the authenticated data write operation performed in an advanced RPMB mode according to an embodiment of the present disclosure.

FIG. 21 is a flowchart illustrating the authenticated data write operation performed in the advanced RPMB mode according to an embodiment of the present disclosure.

Referring to FIGS. 1, 4, and 21, in the advanced RPMB mode, the host 400 may transfer the command PIU once to perform the authenticated data write operation, and the storage device 50 may transfer the response PIU once. The write operation according to the advanced RPMB mode may be performed after the memory controller 200 checks that both of the host access mode and the device access mode match as the advanced RPMB mode.

Specifically, in operation S2101, the host 400 may provide the command PIU to the storage device 50. The command PIU may include the RPMB message in the extra header segment. The command PIU may be the security protocol out command indicating that the host 400 will transmit data. The RPMB message transferred in operation S2101 is described in more detail in the description of FIG. 22 to be described later.

In operation S2103, the storage device 50 may provide the ready to transfer PIU to the host 400 in response to the command PIU received in operation S2101.

In operation S2105, the host 400 may provide the data out PIU to the storage device 50. Since the host 400 has already provided the RPMB message to the storage device 50 by including the RPMB message in the extra header segment of the command PIU in operation S2101, the data out PIU transferred in operation S2105 may not include the RPMB message and may include only the data to be stored in the RPMB.

In operation S2107, the storage device 50 may provide the response PIU to the host 400. The response PIU provided by the storage device 50 may include the RPMB message. The RPMB message may be included in the extra head segment of the response PIU.

FIG. 22 is a diagram illustrating a structure of the command PIU transferred in operation S2101 of FIG. 21 according to an embodiment of the present disclosure.

Referring to FIGS. 1, 4, 21, and 22, the command PIU transferred in operation S2101 may be the PIU using the extra header segment, differently from the command PIU transferred in the embodiment described with reference to FIGS. 14 to 20. Therefore, a field indicating total extra header segment length information included in the basic header segment may be set to a non-zero value (02h).

The extra header segment of the command PIU transferred in operation S2101 may include the RPMB message. The RPMB message included in the extra header segment may include some data of the RPMB message corresponding to the authenticated data write request described with reference to FIG. 15.

Specifically, the extra header segment of the command PIU may include the authentication data and the metadata. Differently from the RPMB message of FIG. 15, the metadata included in the extra header segment may not include the data to be stored in the RPMB. The metadata may include the nonce generated by the host, the current write count value, the address corresponding to the data, the number of blocks of data (here one block is 4 KB), and the request message type indicating that the RPMB message is the authenticated data write request (0003h). The authentication data may be the MAC generated by the device access controller 210 described with reference to FIG. 4. Here, both of the metadata or the authentication data included in the extra header segment and transmitted may be information required for the authentication.

FIG. 23 is a diagram illustrating a structure of the response PIU transferred in operation S2107 of FIG. 21 according to an embodiment of the present disclosure.

Referring to FIGS. 1, 4, 21, and 23, the response PIU transferred in operation S2107 may be the PIU using the extra header segment, differently from the response PIU transferred in the embodiment described with reference to FIGS. 14 to 20. Therefore, the field indicating the total extra header segment length information included in the basic header segment may be set to a non-zero value (02h).

The extra header segment of the response PIU transferred in operation S2107 may include the RPMB message. The RPMB message included in the extra header segment may include some data of the RPMB message corresponding to the result read response described with reference to FIG. 17.

Specifically, the extra header segment of the response PIU may include the authentication data and the metadata. The metadata may include the write count value of the write counter updated according to the performance of the authenticated data write operation, the address of the data stored by the authenticated data write operation, the result code indicating the performance result of the authenticated data write operation, and the response message type indicating that the RPMB message is the authenticated data write response. Here, the address may be the same value as the address included in the RPMB message corresponding to the authenticated data write request described with reference to FIG. 22. The nonce may be a value obtained by copying the nonce included in the RPMB message corresponding to the authenticated data write request described with reference to FIG. 22. The authentication data may be the MAC generated by the device access controller 210 described with reference to FIG. 4 using the metadata and the authentication key stored in the RPMB.

Figure 24:
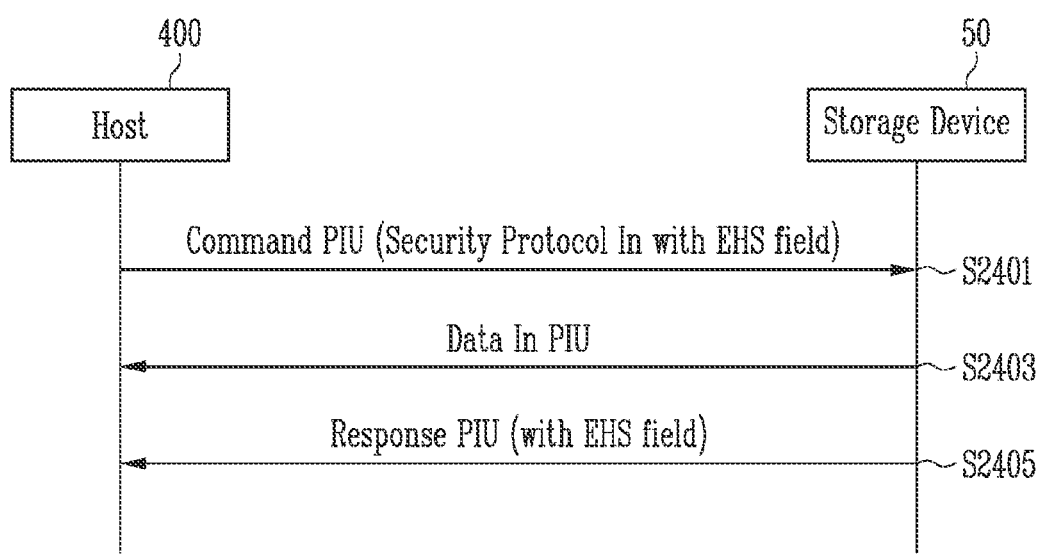
FIG. 24 is a flowchart illustrating the authenticated data read operation performed in the advanced RPMB mode according to an embodiment of the present disclosure.

FIG. 24 is a flowchart illustrating the authenticated data read operation performed in the advanced RPMB mode according to an embodiment of the present disclosure.

Referring to FIGS. 1, 4, and 24, in the advanced RPMB mode, the host 400 may transfer the command PIU once to perform the authenticated data read operation, and the storage device 50 may transfer the response PIU once. The read operation according to the advanced RPMB mode may be performed after the memory controller 200 checks that both of the host access mode and the device access mode match as the advanced RPMB mode.

Specifically, in operation S2401, the host 400 may provide the command PIU to the storage device 50. The command PIU may include the RPMB message in the extra header segment. The command PIU may be a security protocol in command indicating that the host 400 requests transferal of data to the storage device 50. The RPMB message transferred in operation S2401 is described in more detail in the description of FIG. 25 to be described later.

In operation S2403, the storage device 50 may read the data stored in the RPMB using the RPMB message included in the command PIU received in operation S2401, and provide the data in PIU including the read data to the host 400. Since the host 400 has already provided the RPMB message to the storage device 50 by including the RPMB message in the extra header segment of the command PIU in operation S2401, the data in PIU transferred in operation S2403 may not include the RPMB message and may include only the data read from the RPMB.

In operation S2405, the storage device 50 may provide the response PIU to the host 400. The response PIU provided by the storage device 50 may include the RPMB message. The RPMB message may be included in the extra head segment of the response PIU. The RPMB message provided by the storage device 50 to the host 400 in operation S2405 is described in more detail with reference to FIG. 26 to be described later. Here, both of the metadata and the authentication data included in the extra header segment and transmitted may be information required for the authentication.

FIG. 25 is a diagram illustrating a structure of the command PIU transferred in operation S2401 of FIG. 24 according to an embodiment of the present disclosure.

Referring to FIGS. 1, 4, 24, and 25, the command PIU transferred in operation S2401 may be the PIU using the extra header segment, differently from the command PIU transferred in the embodiment described with reference to FIGS. 14 and 20. Therefore, the field indicating the total extra header segment length information included in the basic header segment may be set to a non-zero value (02h).

The extra header segment of the command PIU transferred in operation S2401 may include the RPMB message. The RPMB message included in the extra header segment may include some or all of the data included in the RPMB message corresponding to the authenticated data read request described with reference to FIG. 19.

Specifically, the extra header segment of the command PIU may include the authentication data and the metadata. In an embodiment, the command PIU may include only the metadata without the authentication data. The metadata may include the nonce generated by the host, the address to be read, the advanced RPMB block count indicating the number of blocks of data to be read (here one block is 4 KB), and 0004h which is the request message type indicating that the RPMB message included in the extra header segment is the authenticated data read request. In an embodiment, a value corresponding to each of the MAC, the write counter, and the result included in the RPMB message included in the extra header segment may be "0".

Figure 26:
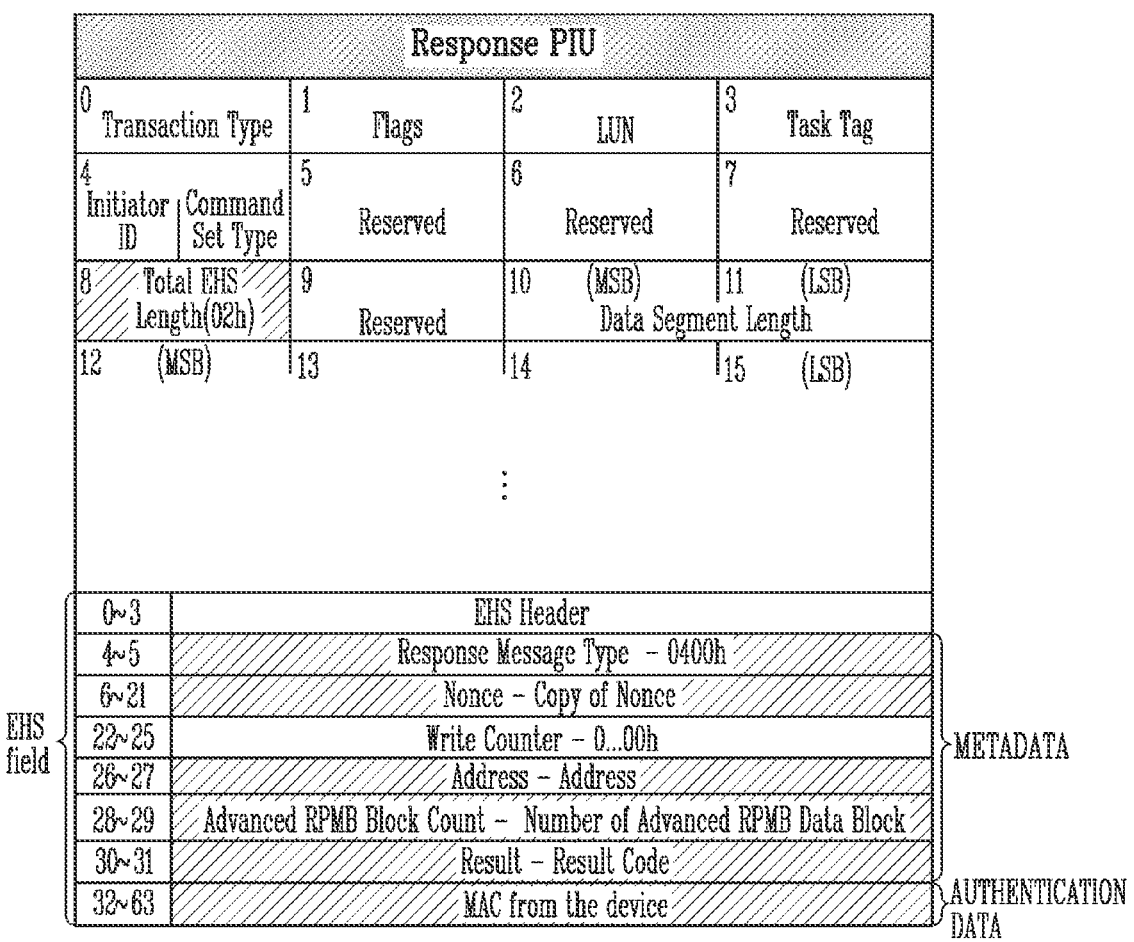
FIG. 26 is a diagram illustrating a structure of the response PIU transferred in operation S2405 of FIG. 24 according to an embodiment of the present disclosure.

FIG. 26 is a diagram illustrating a structure of the response PIU transferred in operation S2405 of FIG. 24 according to an embodiment of the present disclosure.

Referring to FIGS. 1, 4, 24, and 26, the response PIU transferred in operation S2405 may be the PIU using the extra header segment differently from the response PIU transferred in the embodiment described with reference to FIGS. 14 to 20. Therefore, the field indicating the total extra header segment length information included in the basic header segment may be set to a non-zero value (02h).

The extra header segment of the response PIU transferred in operation S2405 may include the RPMB message. The RPMB message included in the extra header segment may be the RPMB message corresponding to the authenticated data read response described with reference to FIG. 20. The extra header segment may include the authentication data and the metadata. The authentication data may be the MAC generated by the device access controller 210 of the storage device 50. The metadata may include the data read from the RPMB, the nonce, the address, the advanced RPMB block count indicating the number of blocks of the read data, and the response message type indicating that the RPMB message is the authenticated data read response.

The nonce may be the nonce included in the RPMB message corresponding to the authenticated data read request transferred through operation S2401, that is, a value obtained by copying the nonce value generated by the host 400 as it is. The address and the block count of the read data may be the same value as the address to be read and the block count indicating the number of blocks of the data to be read included in the RPMB message corresponding to the authenticated data read request. The result may be the result code indicating the performance result of the authenticated data read operation. The response message type may be a code 0400h indicating that the RPMB message is the authenticated data read response.

The host access controller 410 included in the host 400 may receive the data read according to the authenticated data read operation in operation S2403, and in operation S2405, after receiving the RPMB message corresponding to the authenticated data read response, the host access controller 410 may operate the MAC using the authentication key included in the host access controller 410 and the metadata included in the RPMB message. Only when the MAC calculated by the host access controller 410 and the MAC generated by the storage device 50 which is the authentication data included in the RPMB message match, the host access controller 410 may obtain the read data.

According to the embodiment described with reference to FIGS. 21 to 26, in the advanced RPMB mode, since the RPMB message is included in the extra header segment and transmitted, differently from the normal RPMB mode, transmission through the data in PIU or the data out PIU is not required. Therefore, in the advanced RPMB mode, since the number of PIUs to be transmitted is less than that in the normal RPMB mode, the advanced RPMB mode may be a mode in which the RPMB may be accessed at a speed faster than in the normal RPMB mode.

Figure 27:
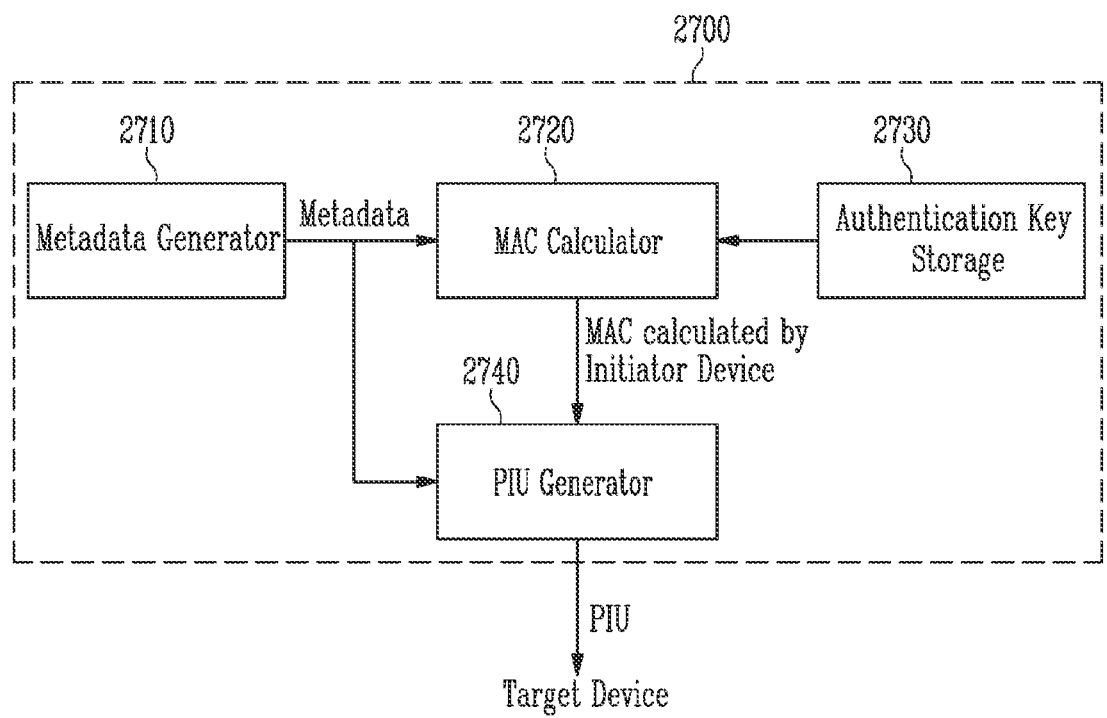
FIG. 27 is a diagram illustrating a PIU transmitter 2700 included in an initiator device according to an embodiment of the present disclosure.

FIG. 27 is a diagram illustrating a PIU transmitter 2700 included in the initiator device according to an embodiment of the present disclosure.

Referring to FIGS. 4 and 27, the host 400 and the storage device 50 may perform an operation related to the RPMB while transmitting and receiving the PIU. In a process of performing the authenticated data write operation and the authenticated data read operation described through FIGS. 14 to 26, both of the host access controller 410 and the device access controller 210 may generate the PIU, and transmit the generated PIU or receive the PIU transmitted from a counterpart, to perform the authentication. Therefore, the host access controller 410 and the device access controller 210 may include both of the PIU transmitter 2700 and a PIU receiver 2800 described with reference to FIG. 27 to be described later.

A device generating the PIU may be the initiator device. A device receiving the generated PIU may be the target device. When the host access controller 410 provides the PIU to the device access controller 210, the host 400 may be the initiator device and the storage device 50 may be the target device. Conversely, when the device access controller 210 provides the PIU to the host access controller 410, the storage device 50 may be the initiator device, and the host 400 may be the target device.

The PIU transmitter 2700 may include a MAC calculator 2720, an authentication key storage 2730, a metadata generator 2710, and a PIU generator 2740.

The authentication key storage 2730 may store the authentication key. The authentication key storage 2730 may correspond to the authentication key 111 included in the secure storage area 110a described with reference to FIG. 4. The authentication key may be stored in the RPMB according to the authentication key programming operation. Since the authentication key is used to generate the MAC when performing the authenticated data write operation and the authenticated data read operation, the authentication key is required to be stored in the RPMB before performing the authenticated data write operation and authenticated data read operation. The metadata generator 2710 may generate the metadata. The metadata may be included in the RPMB message. The metadata may include different components according to a type of the RPMB message. The components that may be included in the metadata may be at least one of the write count value, the request message type, the response message type, the result, the address, the nonce, the data, the advanced RPMB data, the block count, and the advanced RPMB block count described with reference to FIG. 9.

The metadata generator 2710 may provide the generated metadata to the MAC calculator 2720 and the PIU generator 2740.

The MAC calculator 2720 may generate the MAC using the metadata and the authentication key stored in the authentication key storage 2730. Specifically, the MAC calculator 2720 may generate the MAC using a hash-based message authentication code (HMAC SHA-256). The generated MAC may be used by the target device to perform the authentication. The MAC may have a length of 256 bits (32 bytes). The authentication key used to generate the MAC may be 256 bits. However, the sizes of the MAC and the authentication key are not limited according to an embodiment of the present disclosure. The MAC calculator 2720 may provide the generated MAC to the PIU generator 2740.

The PIU generator 2740 may generate the PIU to be provided to the target device. Specifically, the PIU generator 2740 may generate the RPMB message including the authentication data and the metadata. The authentication data may be the MAC generated by the MAC calculator 2720. In an embodiment, the authentication data included in the RPMB corresponding to the authentication key programming request provided in the authentication key programming operation may be the authentication key itself.

In the normal RPMB mode, the PIU generator 2740 may provide the generated RPMB message to the target device through the data in PIU or the data out PIU.

In the advanced RPMB mode, the PIU generator 2740 may generate the PIU including the RPMB message in the extra header segment, and provide the generated PIU to the target device. In the advanced RPMB mode, the total extra header segment length field in the basic header segment of the PIU including the RPMB message may include a non-zero value.

Figure 28:
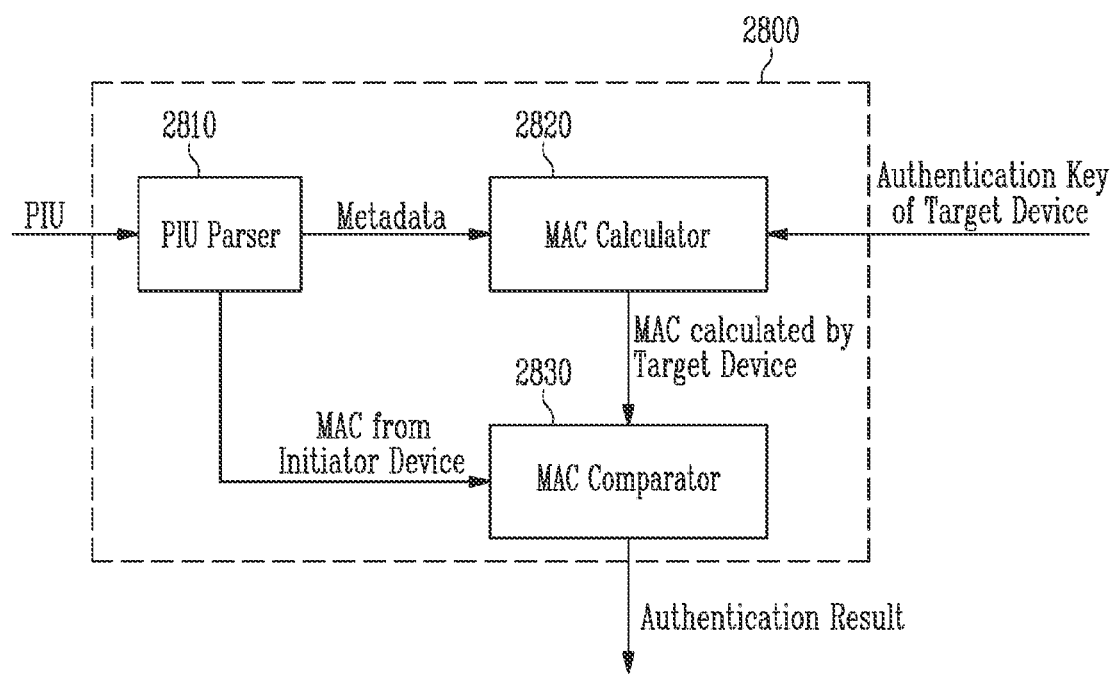
FIG. 28 is a diagram illustrating a PIU receiver 2800 included in a target device according to an embodiment of the present disclosure.

FIG. 28 is a diagram illustrating the PIU receiver 2800 included in the target device according to an embodiment of the present disclosure.

Referring to FIGS. 4 and 28, the host 400 and the storage device 50 may perform the operation related to the RPMB while transmitting and receiving the PIU. In the process of performing the authenticated data write operation and the authenticated data read operation described through FIGS. 14 to 26, both of the host access controller 410 and the device access controller 210 may generate the PIU, and transmit the generated PIU or receive the PIU transmitted from a counterpart, to perform the authentication. Therefore, the host access controller 410 and the device access controller 210 may include both of the PIU transmitter 2700 described with reference to FIG. 27 and the PIU receiver 2800.

The device generating the PIU may be the initiator device. The device receiving the generated PIU may be the target device. When the host access controller 410 provides the PIU to the device access controller 210, the host 400 may be the initiator device and the storage device 50 may be the target device. Conversely, when the device access controller 210 provides the PIU to the host access controller 410, the storage device 50 may be the initiator device, and the host 400 may be the target device.

The PIU receiver 2800 may include a PIU parser 2810, a MAC calculator 2820, and a MAC comparator 2830. The PIU parser 2810 may receive the PIU provided by the initiator device. The PIU received by the PIU parser 2810 may be the data in PIU or the data out PIU in the normal RPMB mode. The PIU received by the PIU parser 2810 may be the command PIU or the response PIU in the advanced RPMB mode.

The PIU parser 2810 may obtain the RPMB message by parsing the received PIU, and may obtain the metadata and the authentication data included by parsing the RPMB message. In an embodiment, the metadata may include different components according to the type of the RPMB message. The components that may be included in the metadata may be at least one of the write count value, the request message type, the response message type, the result, the address, the nonce, the data, the advanced RPMB data, the block count, and the advanced RPMB block count described with reference to FIG. 9.

The authentication data may be the MAC generated by the initiator device. In an embodiment, the authentication data included in the RPMB corresponding to the authentication key programming request provided in the authentication key programming operation may be the authentication key itself.

The MAC calculator 2820 may obtain the authentication key previously stored in the target device. The authentication key previously stored in the target device may be the same value as the authentication key stored in the initiator device.

The MAC calculator 2820 may calculate the MAC using the metadata received from the PIU parser 2810 and the authentication key previously stored in the target device. For example, the MAC calculator 2820 may calculate the MAC using a hash-based message authentication code (HMAC SHA-256). The MAC calculator 2820 may provide the calculated MAC to the MAC comparator 2830.

The MAC comparator 2830 may compare whether the MAC received from the PIU parser 2810 and the MAC received from the MAC calculator 2820 match, and may output an authentication result according to a comparison result. The authentication result may be used to perform the authenticated data write operation and the authenticated data read operation, which are operations on the RPMB.

As a result, when the authentication keys stored in the initiator device and the target device are different, or the metadata used for calculating the MAC are different, the authentication may be failed, and only when the authentication keys stored in the initiator device and the target device are the same and the metadata used for calculating the MAC are the same, the authentication may be successful. Therefore, the RPMB may provide a data storage function that provides high security.

Figure 29:
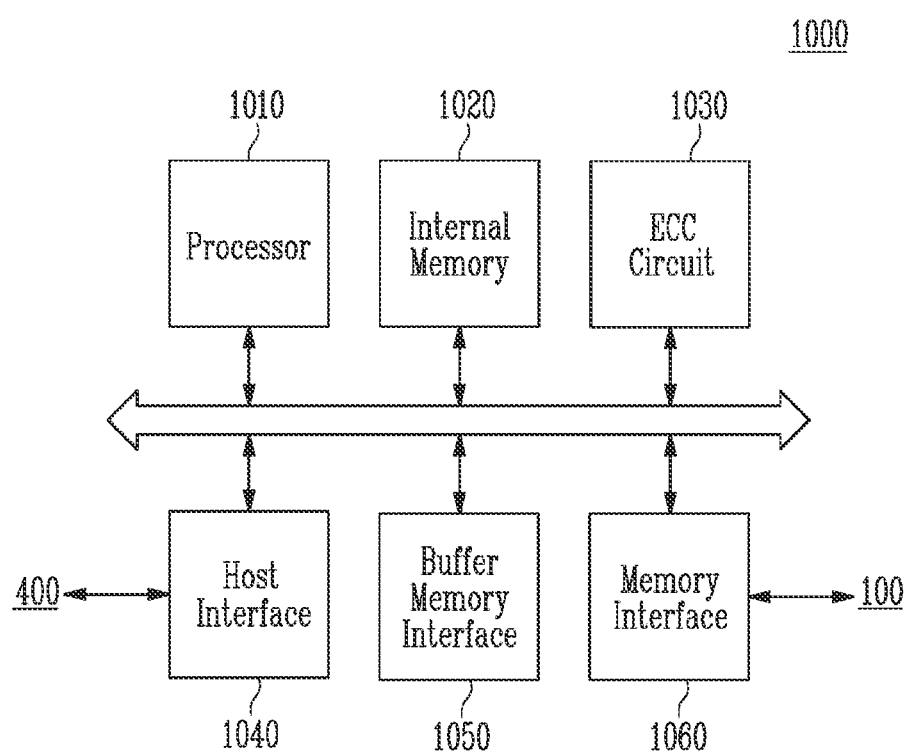
FIG. 29 is a diagram illustrating a memory controller of FIG. 1 according to another embodiment of the present disclosure.

FIG. 29 is a diagram illustrating another embodiment of the memory controller of FIG. 1 according to an embodiment of the present disclosure.

Referring to FIG. 29, the memory controller 1000 may include a processor 1010, an internal memory 1020, an error correction code circuit 1030, a host interface 1040, a buffer memory interface 1050, and a memory interface 1060.

The processor 1010 may perform various operations or may generate various commands for controlling the memory device 100. When receiving a request from the host 400, the processor 1010 may generate a command according to the received request and transmit the generated command to a queue controller (not shown). In addition, the processor 1010 may identify the host access mode for the secure storage area of the host from the command received from the host, and compare the host access mode with the device access mode to determine whether to perform the access operation on the secure storage area. In addition, an authentication operation or the like for accessing the secure storage area may be performed to access the secure storage area in the memory device 100.

The internal memory 1020 may store various pieces of information necessary for an operation of the memory controller 1000. For example, the internal memory 1020 may include logical and physical address map tables. The internal memory 1020 may be configured of at least one of a random access memory (RAM), a dynamic RAM (DRAM), a static RAM (SRAM), a cache, and a tightly coupled memory (TCM). In an embodiment, information of device access mode may be stored in the internal memory 1020, but is not limited thereto, and may be stored in a separate memory different from the memory controller 1000.

The error correction code circuit 1030 is configured to detect and correct an error of data received from the memory device 100 using an error correcting code (ECC). The processor 1010 may adjust a read voltage according to an error detection result of the error correction code circuit 1030 and control the memory device 100 to perform re-reading. In an embodiment, an error correction block may be provided as a component of the memory controller 1000.

The host interface 1040 may exchange a command, an address, data, and the like between the memory controller 1000 and the host 400. For example, the host interface 1040 may receive a request, an address, data, and the like from the host 400, and may output data read from the memory device 100 to the host 400. The host interface 1040 may communicate with the host 400 using a communication standard or interface such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), load reduced DIMM (LRDIMM), enhanced small disk interface (ESDI), or integrated drive electronics (IDE).

The buffer memory interface 1050 may transmit data between the processor 1010 and the buffer memory. The buffer memory may be used as an operation memory or a cache memory of the memory controller 1000, and may store data used in the storage device 50. By the processor 1010, the buffer memory interface 1050 may use the buffer memory as a read buffer, a write buffer, a map buffer, and the like. According to an embodiment, the buffer memory may include a double data rate synchronous dynamic random access memory (DDR SDRAM), DDR4 SDRAM, low power double data rate4 (LPDDR4) SDRAM, graphics double data rate (GDDR) SDRAM, low power DDR (LPDDR), or Rambus dynamic random access memory (RDRAM). When the buffer memory is included in the memory controller 1000, the buffer memory interface 1050 may be omitted.

The memory interface 1060 may exchange the command, the address, the data, and the like between the memory controller 1000 and the memory device 100. For example, the memory interface 1060 may transmit the command, the address, the data, and the like to the memory device 100 and may receive the data and the like from the memory device 100 through a channel. The memory interface 1060 may store data in the secure storage area of the memory device 100 or read data from the secure storage area according to an instruction of the processor 1010.

Figure 30:
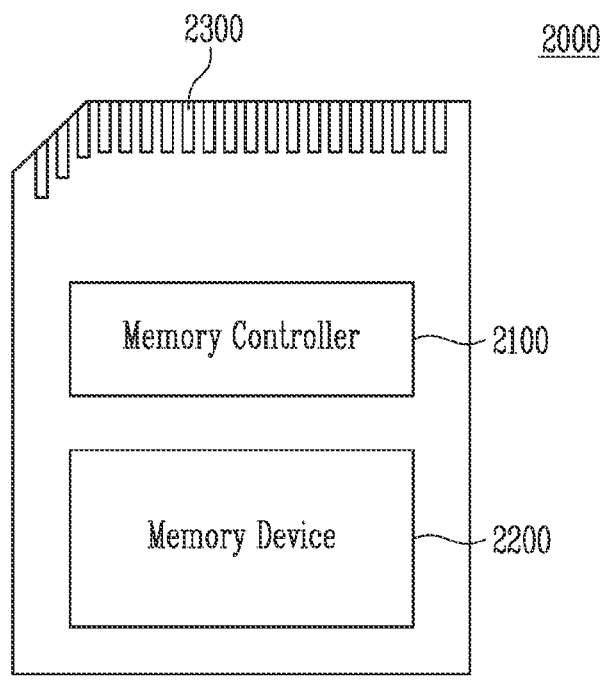
FIG. 30 is a block diagram illustrating a memory card system to which a storage device according to an embodiment of the present disclosure is applied.

FIG. 30 is a block diagram illustrating a memory card system to which a storage device according to an embodiment of the present disclosure is applied.

Referring to FIG. 30, the memory card system 2000 includes a memory controller 2100, a memory device 2200, and a connector 2300.

The memory controller 2100 is connected to the memory device 2200. The memory controller 2100 is configured to access the memory device 2200. In an embodiment, the memory controller 2100 may access a secure storage area in the memory device 2200. For example, the memory controller 2100 may be configured to control read, program, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented equally to the memory controller 200 described with reference to FIG. 1.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards or interfaces described above. The external device may request the memory controller 2100 to access the secure storage area in the memory device 2200.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer torque magnetic RAM (STT-MRAM). The memory device 2200 may include the secure storage area, which is a memory block in which access is limited, such as accessed only through a predetermined special command or authentication, and a normal storage area, which is a memory block that may be accessed without a separate limitation.

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), a secure digital (SD) card (SD, miniSD, microSD, or SDHC), and a universal flash storage (UFS).

Figure 31:
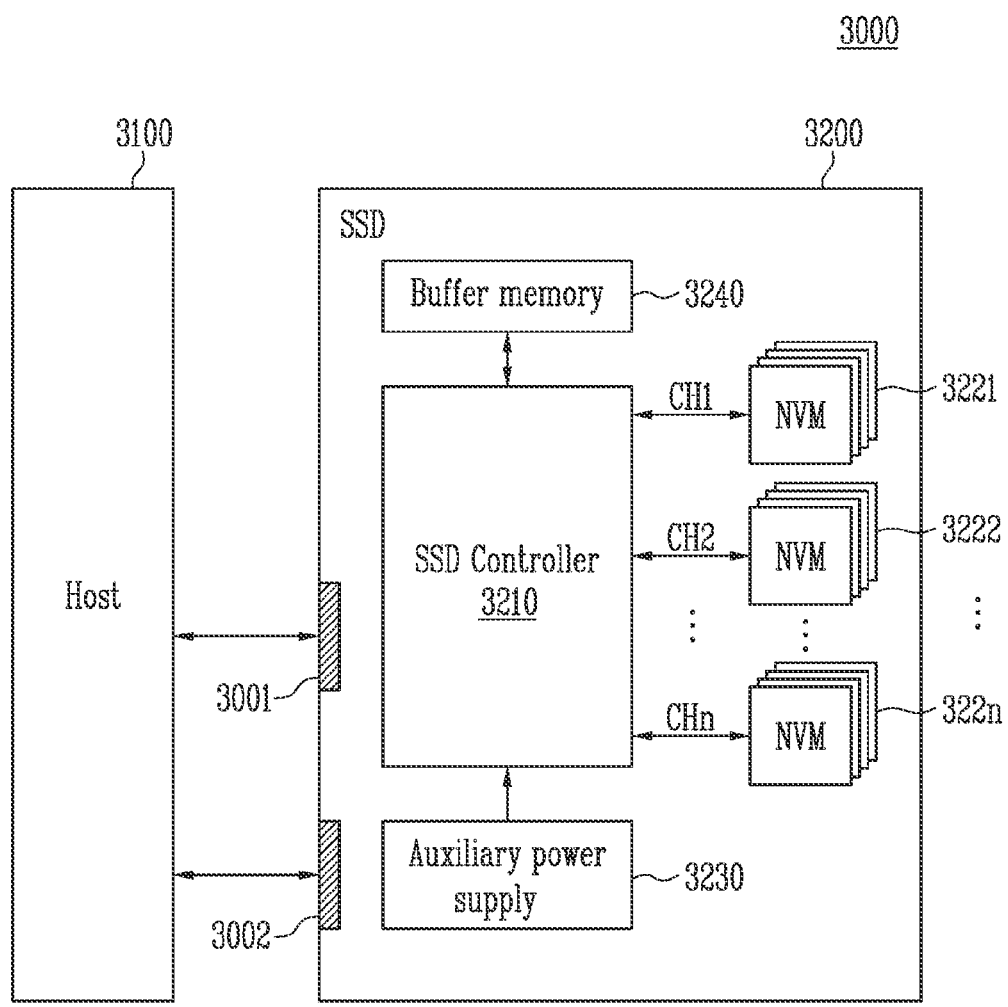
FIG. 31 is a block diagram illustrating a solid state drive (SSD) system to which a storage device according to an embodiment of the present disclosure is applied.

FIG. 31 is a block diagram illustrating a solid state drive (SSD) system to which a storage device according to an embodiment of the present disclosure is applied.

Referring to FIG. 31, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322n, an auxiliary power supply 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal received from the host 3100. For example, the signal may be signals based on an interface between the host 3100 and the SSD 3200. For example, the signal may be a signal defined by at least one of communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. The signal may be transferred in a form of various commands, and may be a signal requesting access to a secure storage area positioned in a portion of the plurality of flash memories 3221 to 322n, or a signal which is a response to the request.

The auxiliary power supply 3230 is connected to the host 3100 through the power connector 3002. The auxiliary power supply 3230 may receive the power from the host 3100 and may charge the power. The auxiliary power supply 3230 may provide power to the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 32:
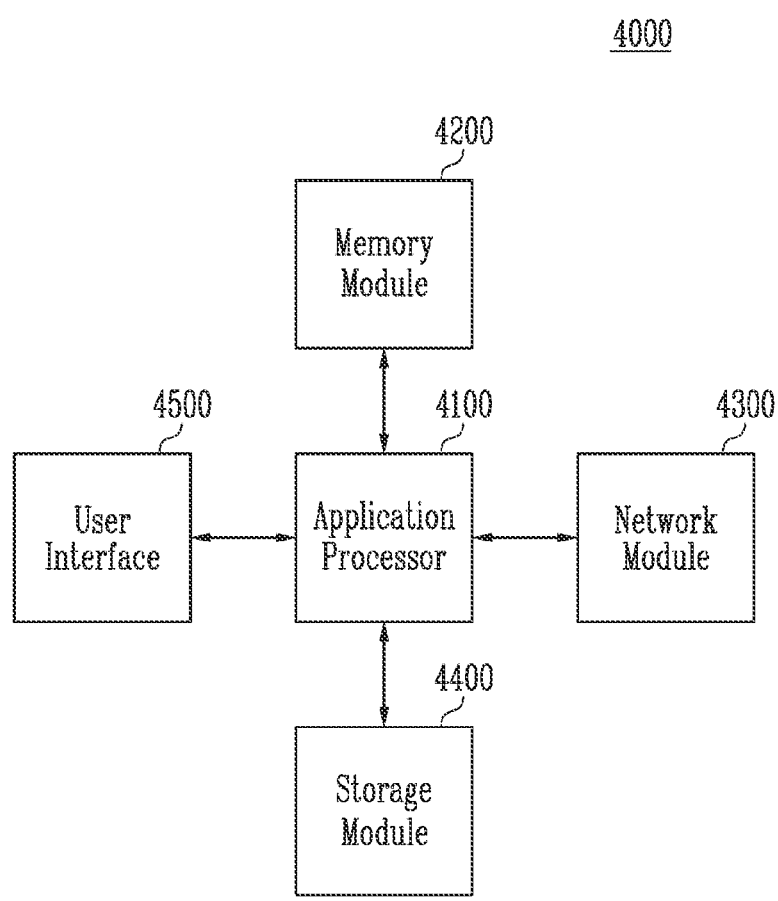
FIG. 32 is a block diagram illustrating a user system to which a storage device according to an embodiment of the present disclosure is applied.

FIG. 32 is a block diagram illustrating a user system to which the storage device according to an embodiment of the present disclosure is applied.

Referring to FIG. 32, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, WiMAX, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. That is, a portion of the plurality of nonvolatile memory devices may include a secure storage area. The storage module 4400 may operate identically to the storage device 50 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

Although various embodiments have been described for illustrative purposes, it will be apparent to those skilled in the art that various changes and modifications may be made without departing from the spirit and scope of the disclosure as defined in the following claims. Furthermore, the embodiments may be combined to form additional embodiments.

What is claimed is:

1. A storage device comprising:
    a memory device including a secure storage area for storing therein data to be accessed according to authentication;
    an access mode memory configured to store therein information of device access mode regarding an operation mode for the secure storage area; and
    a memory controller configured to receive a command regarding the secure storage area from an external host and process the command according to whether information of host access mode included in the command matches the information of the device access mode.

2. The storage device of claim 1, wherein the memory controller is further configured to access the secure storage area when a predetermined command is received or when the authentication is passed.

3. The storage device of claim 1, wherein the information of the host access mode includes information regarding the operation mode for the secure storage area, the information of the host access mode being provided by the host.

4. The storage device of claim 1, wherein each of the host access mode and the device access mode is a first access mode or a second access mode, in which an access speed to the secure storage area is faster than in the first access mode.

5. The storage device of claim 4, wherein the memory controller is further configured to obtain, when the device access mode is the first access mode, information required for the authentication from an additional command provided subsequently to the command.

6. The storage device of claim 4, wherein the memory controller is further configured to obtain, when the device access mode is the second access mode, information required for the authentication from the command.

7. The storage device of claim 4, wherein the command comprises:
    a common segment commonly included in commands transferred between the external host and the memory controller,
    a unique field including a unique value according to a type of the commands, and
    an extra segment that is distinct from the common segment.

8. The storage device of claim 7, wherein the common segment includes information indicating a length of the extra segment.

9. The storage device of claim 8, wherein the memory controller is further configured to identify the host access mode based on at least one of the extra segment and the information indicating the length of the extra segment.

10. The storage device of claim 9, wherein the memory controller identifies the host access mode as the first access mode when the length of the extra segment is 0 or the extra segment does not include information required for the authentication.

11. The storage device of claim 9, wherein the memory controller identifies the host access mode as the second access mode when the length of the extra segment is not 0 or the extra segment includes information required for the authentication.

12. The storage device of claim 11, wherein the information required for the authentication includes at least a portion of metadata for the secure storage area and authentication key data.

13. The storage device of claim 1, wherein, when the host access mode and the device access mode match, the memory controller accesses the secure storage area according to matched access mode.

14. The storage device of claim 1, wherein the memory controller is further configured to deny accessing the secure storage area, when the host access mode and the device access mode do not match.

15. The storage device of claim 14, wherein the memory controller denies the accessing of the secure storage area by providing the external host with information indicating an error.

16. The storage device of claim 4, wherein the access mode memory is further configured to store therein one or more of information regarding whether the storage device supports the second access mode and information regarding whether the storage device activates the second access mode.

17. A method of operating a storage device, the method comprising:
    storing, in a memory device including a secure storage area, data to be accessed according to authentication;
    storing, in an access mode memory, information of device access mode regarding an operation mode for the secure storage area;
    receiving a command regarding the secure storage area from an external host;
    identifying, based on the command, a host access mode indicating an operation mode for the secure storage area of the external host within the memory device;
    comparing the host access mode and the device access mode; and
    processing, by a memory controller, based on the comparing, the command received from the external host according to whether information of the host access mode included in the command matches the information of the device access mode.

18. The method of claim 17, further comprising accessing, when the host access mode and the device access mode match, the secure storage area according to matched access mode.

19. The method of claim 17, further comprising providing information indicating an error to the external host when the host access mode and the device access mode do not match.

20. A computing system comprising:
a storage device comprising:
a memory device including a secure storage area for storing therein data to be accessed according to authentication;
an access mode memory configured to store therein information of device access mode regarding an operation mode for the secure storage area; and
a memory controller configured to control the memory device and the access mode memory; and
a host device configured to provide a command regarding the secure storage area to the storage device,
wherein the memory controller is further configured to process the command according to whether information of host access mode included in the command matches the information of the device access mode.

* * * * *